United States Patent
Warren et al.

(10) Patent No.: US 9,605,591 B2
(45) Date of Patent: *Mar. 28, 2017

(54) ARBITRAGE CONTROL SYSTEM FOR TWO OR MORE AVAILABLE POWER SOURCES

(75) Inventors: Kelcy L. Warren, Dallas, TX (US); Mike Warren, Dallas, TX (US)

(73) Assignee: Energy Transfer Group, L.L.C., Dallas, TX (US)

( * ) Notice: Subject to any disclaimer, the term of this patent is extended or adjusted under 35 U.S.C. 154(b) by 1713 days.

This patent is subject to a terminal disclaimer.

(21) Appl. No.: 10/688,614

(22) Filed: Oct. 17, 2003

(65) Prior Publication Data

US 2004/0098142 A1    May 20, 2004

Related U.S. Application Data

(63) Continuation-in-part of application No. 09/685,929, filed on Oct. 9, 2000, now Pat. No. 6,636,784, and a
(Continued)

(51) Int. Cl.
*F02C 6/00* (2006.01)
*G06F 17/00* (2006.01)
(Continued)

(52) U.S. Cl.
CPC ............. *F02C 6/00* (2013.01); *F01D 15/10* (2013.01); *F02C 7/275* (2013.01); *H02J 3/008* (2013.01); *H02J 3/06* (2013.01); *Y04S 50/10* (2013.01)

(58) Field of Classification Search
CPC ...... B60W 20/00; B60W 20/10; B60W 20/20; H02J 9/06; H02J 9/08; H02J 3/008;
(Continued)

(56) References Cited

U.S. PATENT DOCUMENTS 3,702,460 A    11/1972   Blose ........................... 340/150
3,866,108 A    2/1975    Yannone et al.
(Continued)

FOREIGN PATENT DOCUMENTS

EP    1083319 A1    3/2001
GB    2076897 A    12/1981
(Continued)

OTHER PUBLICATIONS

Nakhamkin, M. et al., "Compressed Air Energy Storage: Plant Integration, Turbomachinery Development", ASME International Gas Turbine Symposium and Exhibition, Beijing, Peoples' Republic of China, 1985. Pages 6.*
(Continued)

*Primary Examiner* — Igor Borissov
(74) *Attorney, Agent, or Firm* — Daniel J. Chalker; Chalker Flores, LLP

(57) ABSTRACT

The present invention provides an arbitrage control system for two or more available power sources (106, 108) that enables the automatic or manual control of one or more multi-source systems (202) to take advantage of price differentials across commodities, locations and/or time. The present invention selects a power source for a device or delivery point (110) from two or more available power sources (106, 108) by analyzing market and operational data (406). A power source (106 or 108) for the device or delivery point (110) is then selected from the two or more available power sources (106, 108) based on a set of financial parameters (408). If the device or delivery point (110) is not already connected to the selected power source, one or more signals are sent (418) to switch the device or delivery point (110) to the selected power source. The arbitrage controller (102) includes a user interface (300), market interface (302), multi-source interface (304), database (306) and processor
(Continued)

(308). The processor (308) is communicably coupled to the user interface (300), the market interface (302), the multi-source interface (304) and the database (306).

76 Claims, 18 Drawing Sheets

Related U.S. Application Data continuation-in-part of application No. 09/947,719, filed on Sep. 6, 2001, now Pat. No. 6,912,451, and a continuation-in-part of application No. 09/947,728, filed on Sep. 6, 2001, now Pat. No. 6,750,557.

(51) Int. Cl.
  *F01D 15/10* (2006.01)
  *F02C 7/275* (2006.01)
  *H02J 3/00* (2006.01)
  *H02J 3/06* (2006.01)

(58) Field of Classification Search
  CPC . H02J 3/06; H02P 9/00; H02K 7/1823; H02K 7/18; F01D 15/10; F02C 6/00; F02C 7/275
  USPC ... 290/4 R–4 D, 40 A, 40 B, 40 C, 40 D, 51, 290/52; 318/153, 156; 700/287, 291, 75, 700/22; 705/400, 7.35, 1.1, 412
  See application file for complete search history.

(56) References Cited

U.S. PATENT DOCUMENTS

| | | | |
|---|---|---|---|
| 3,888,325 A | 6/1975 | Reinbeck | |
| 3,943,374 A * | 3/1976 | Clements | 290/52 |
| 3,975,673 A | 8/1976 | Boshnyaga et al. | 323/119 |
| 4,013,942 A | 3/1977 | Boshnyaga et al. | 323/119 |
| 4,077,748 A | 3/1978 | Potz | |
| 4,117,343 A | 9/1978 | Hoffeins | |
| 4,156,174 A | 5/1979 | Specht | 323/43.5 |
| 4,182,128 A | 1/1980 | Gardner | |
| 4,198,595 A | 4/1980 | Milkovic | 323/6 |
| 4,305,254 A | 12/1981 | Kawakatsu et al. | 60/716 |
| 4,441,028 A | 4/1984 | Lundberg | 290/52 |
| 4,621,198 A | 11/1986 | Roberge et al. | 307/82 |
| 4,724,331 A | 2/1988 | Nordlund | |
| 4,802,100 A | 1/1989 | Aasen et al. | |
| 4,885,912 A | 12/1989 | Nakhamkin | |
| 5,081,365 A | 1/1992 | Field et al. | |
| 5,103,923 A | 4/1992 | Johnston et al. | |
| 5,166,597 A | 11/1992 | Larsen et al. | 323/215 |
| 5,323,613 A | 6/1994 | Akiyama | 60/608 |
| 5,351,775 A | 10/1994 | Johnston et al. | |
| 5,371,485 A | 12/1994 | Manimalethu | 336/180 |
| 5,416,398 A | 5/1995 | Blatter | |
| 5,461,300 A | 10/1995 | Kappenman | 323/215 |
| 5,489,001 A | 2/1996 | Yang | |
| 5,528,507 A | 6/1996 | McNamara et al. | 364/483 |
| 5,603,671 A | 2/1997 | Schmidt | |
| 5,619,119 A | 4/1997 | Pelletier et al. | 323/215 |
| 5,635,768 A | 6/1997 | Birch et al. | |
| 5,667,029 A | 9/1997 | Urban et al. | |
| 5,689,141 A | 11/1997 | Kikkawa et al. | |
| 5,730,676 A | 3/1998 | Schmidt | |
| 5,789,882 A | 8/1998 | Ibaraki et al. | |
| 5,801,499 A | 9/1998 | Tsuzuki et al. | |
| 5,826,671 A | 10/1998 | Nakae et al. | |
| 5,847,469 A | 12/1998 | Tabata et al. | |
| 5,856,709 A | 1/1999 | Ibaraki et al. | 290/45 |
| 5,899,085 A | 5/1999 | Williams | 62/236 |
| 5,907,239 A | 5/1999 | Pelletier et al. | 323/361 |
| 5,927,415 A | 7/1999 | Ibaraki et al. | |
| 6,005,759 A | 12/1999 | Hart et al. | 361/66 |
| 6,007,227 A | 12/1999 | Carlson | |
| 6,058,379 A | 5/2000 | Odom et al. | 705/37 |
| 6,059,064 A | 5/2000 | Nagano et al. | |
| 6,093,975 A | 7/2000 | Peticolas | |
| 6,099,265 A | 8/2000 | Rowe, Jr. et al. | 417/313 |
| 6,153,943 A | 11/2000 | Mistr, Jr. | |
| 6,203,468 B1 | 3/2001 | Nitta et al. | |
| 6,230,507 B1 | 5/2001 | Ban et al. | |
| 6,306,057 B1 | 10/2001 | Morisawa et al. | |
| 6,313,544 B1 | 11/2001 | Mongia et al. | 290/52 |
| 6,380,637 B1 | 4/2002 | Hsu et al. | 290/1 R |
| 6,396,165 B1 | 5/2002 | Nagano et al. | 307/10.6 |
| 6,408,625 B1 | 6/2002 | Woon et al. | 60/608 |
| 6,410,992 B1 | 6/2002 | Wall et al. | |
| 6,418,419 B1 | 7/2002 | Nieboer et al. | 705/37 |
| 6,441,506 B2 | 8/2002 | Nakashima | |
| 6,450,283 B1 | 9/2002 | Taggett | |
| 6,490,506 B1 | 12/2002 | March | 700/286 |
| 6,512,305 B1 | 1/2003 | Pinkerton et al. | 290/52 |
| 6,563,229 B2 | 5/2003 | Farkas | |
| 6,570,265 B1 * | 5/2003 | Shiraishi et al. | 290/40 C |
| 6,592,484 B1 | 7/2003 | Tsai et al. | |
| 6,628,006 B2 | 9/2003 | Oglesby et al. | |
| 6,636,784 B1 | 10/2003 | Tanner et al. | |
| 6,718,927 B2 | 4/2004 | Goetze et al. | |
| 6,750,557 B2 | 6/2004 | Poteet et al. | |
| 2002/0038279 A1 | 3/2002 | Samuelson et al. | 705/37 |
| 2002/0049667 A1 | 4/2002 | Navani et al. | 705/37 |
| 2002/0157881 A1 | 10/2002 | Bakholdin et al. | |
| 2002/0163200 A1 | 11/2002 | Oglesby et al. | 290/52 |
| 2002/0165816 A1 | 11/2002 | Barz | 705/37 |
| 2003/0055776 A1 | 3/2003 | Samuelson | 705/37 |
| 2003/0101123 A1 | 5/2003 | Alvarado et al. | 705/36 |
| 2005/0072164 A1 * | 4/2005 | MacKay | 60/805 |
| 2005/0116473 A1 | 6/2005 | Poteet et al. | |
| 2005/0200133 A1 | 9/2005 | Wobben | |

FOREIGN PATENT DOCUMENTS

| | | |
|---|---|---|
| WO | 03023204 A2 | 3/2003 |
| WO | 03023530 A1 | 3/2003 |

OTHER PUBLICATIONS

Lyman, et al. 1938. Application of Large Phase Shifting Transformer on an Interconnected System Loop. Transactions. Oct. 1938. vol. 57. pp. 579-588.

Takamasa, Abstract of JPS6278405 (A), Apr. 10, 1987, Espacenet.

* cited by examiner

ARBITRAGE CONTROL SYSTEM FOR TWO OR MORE AVAILABLE POWER SOURCES

PRIORITY CLAIM

This patent application is a continuation-in-part of three U.S. patent applications: Ser. No. 09/685,929 filed on Oct. 9, 2000; Ser. No. 09/947,719 filed on Sep. 6, 2001; and Ser. No. 09/947,728 filed on Sep. 6, 2001.

FIELD OF THE INVENTION

The present invention relates generally to the field of control systems and, more particularly, to an arbitrage control system for two or more available power sources.

BACKGROUND OF THE INVENTION

Arbitrage is the capture of profits by taking advantage of price differentials across commodities, locations and/or time. Individuals and companies have long engaged in arbitrage in the commodity and financial sectors. More recently, individuals and companies have engaged in arbitrage in the energy sector. As a result, sophisticated analysis and trading systems have been developed to facilitate energy related transactions involving natural gas and electrical power. Although these systems facilitate energy sector arbitrage, they do not physically control the field equipment used to generate, store and transmit the subject of the arbitrage, e.g., natural gas or electricity. Accordingly, there is a need for an arbitrage control system for two or more power sources.

SUMMARY OF THE INVENTION

The present invention provides an arbitrage control system for two or more available power sources that enables the automatic or manual control of one or more multi-source systems to take advantage of price differentials across commodities, locations and/or time. More specifically, the present invention provides a method for selecting a power source for a device or delivery point from two or more available power sources by analyzing market and operational data related to the two or more available power sources, and the device or delivery point. A power source for the device or delivery point is then selected from the two or more available power sources based on a set of financial parameters. If the device or delivery point is not already connected to the selected power source, one or more signals are sent to switch the device or delivery point to the selected power source. The present invention may also determine whether it is profitable to switch the device or delivery point to the selected power source and only send the one or more signals when it is profitable to switch the device or delivery point to the selected power source. Moreover, these steps may be periodically repeated and performed on more than one multi-source system. Furthermore, this method can be implemented as a computer program embodied on a computer readable medium wherein each step is performed by one or more code segments.

In addition, the present invention provides an apparatus for selecting a power source for a device or delivery point from two or more available power sources that includes a user interface, a market interface, a multi-source interface, a database and a processor. The processor is communicably coupled to the user interface, the market interface, the multi-source interface and the database. The processor analyzes market and operational data related to the two or more available power sources and the device or delivery point, selects the power source for the device or delivery point from the two or more available power sources based on a set of financial parameters and sends one or more signals via the multi-source interface to switch the device or delivery point to the selected power source whenever the device or delivery point is not already connected to the selected power source. The processor may also determine whether it is profitable to switch the device or delivery point to the selected power source and only send the one or more signals when it is profitable to switch the device or delivery point to the selected power source. Moreover, the processor may periodically repeat these steps and perform these steps for more than one multi-source system.

Other features and advantages of the present invention shall be apparent to those of ordinary skill in the art upon reference to the following detailed description taken in conjunction with the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The present invention provides an arbitrage control system for two or more available power sources that enables the automatic or manual control of one or more multi-source systems to take advantage of price differentials across commodities, locations and/or time.

Figure 1A:
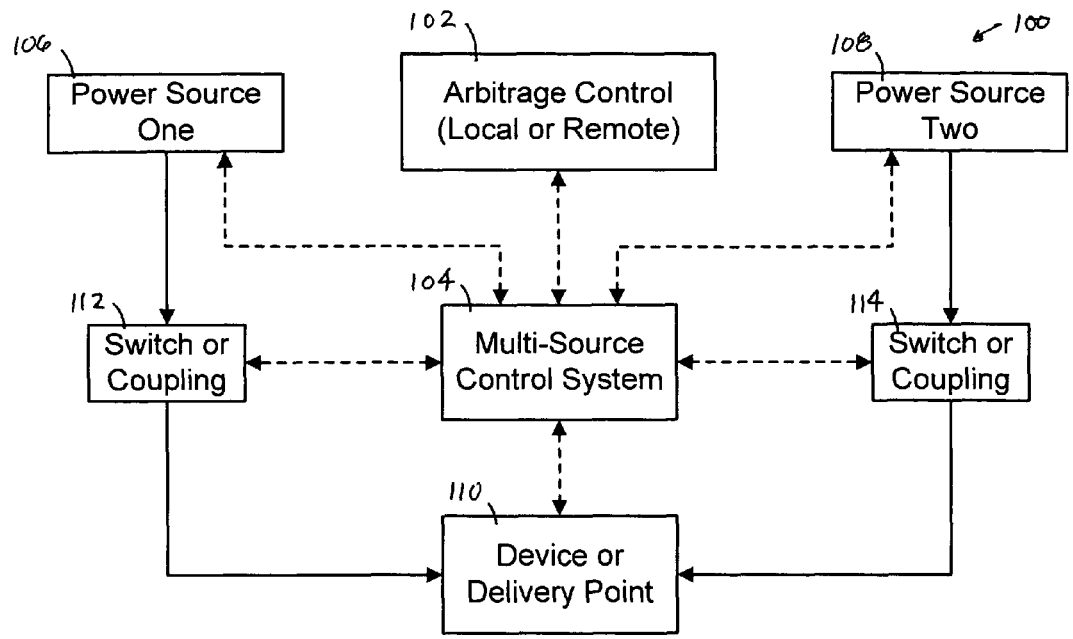
FIG. 1A is a block diagram of an arbitrage control system in accordance with one embodiment of the present invention.

Referring now to FIG. 1A, a block diagram of an arbitrage system 100 in accordance with one embodiment of the present invention is shown. The arbitrage system 100 includes an arbitrage controller 102 and a multi-source system (collectively 104-114). The arbitrage controller 102 can be a processor, computer, programmable logic controller or other control device that is local or remote to the multi-source system. Moreover, the arbitrage controller 102 can be combined, integrated or added to the multi-source control system 104 as hardware, software or a combination thereof. In addition, the arbitrage controller 102 can be operated as an automated, semi-automated or manual system. For example, the arbitrage controller 102 can be manually controlled by an operator based on an off-system analysis of market and operational data. Furthermore, the multi-source system is not limited to the embodiments illustrated in FIGS. 1A, 1B and 1C and only requires that two or more power sources (106 and 108) can be selectively connected to a device or delivery point 110 in any desirable manner.

As shown, power source one 106 is selectively connected to device or delivery point 110 with switch or coupling 112. Similarly, power source two 108 is selectively connected to device or delivery point 110 with switch or coupling 114. Selectively connecting one of the power sources 106 or 108 to the device or delivery point 110 means that selected power source 106 or 108 is providing electrical or mechanical power to the device or delivery point 110. Note that the unselected power source 106 or 108 can still be physically connected to the device or delivery point 110 even though it is not providing power to the device or delivery point 110 (e.g., free wheeling drive shaft running through an engine or motor). The multi-source control system 104 monitors and controls (as indicated by the dashed lines) power source one 106, power source two 108, device or delivery point 110, and switch or couplings 112 and 114. Typically, the delivery point 110 will be an electrical connection to an electrical network and the device 110 will be a compressor, pump or other machine. Likewise, the available power sources 106 and 108 can be an electricity source or a mechanical source. The typical electrical sources include electrical network connections, combustion turbine generators, steam turbine generators, batteries, fuel cells, solar cells, wind generators, biomass generators or hydroelectric generators. The typical mechanical sources include engines, motors, motor/generators or turbines. The type of switch or coupling 112 and 114 used will depend on the specifics of the corresponding power source and device or delivery point. For example, an electrical source will typically be connected to an electrical switching device and a mechanical source will typically be connected to a clutch, coupling (e.g., fixed, magnetic, etc.) or gearbox. For example, switch or coupling 112 and 114 can be a fixed coupling with an overrunning clutch. Moreover, the switch or coupling 112 and 114 can be designed to interface with more than one power source.

Figure 1B:
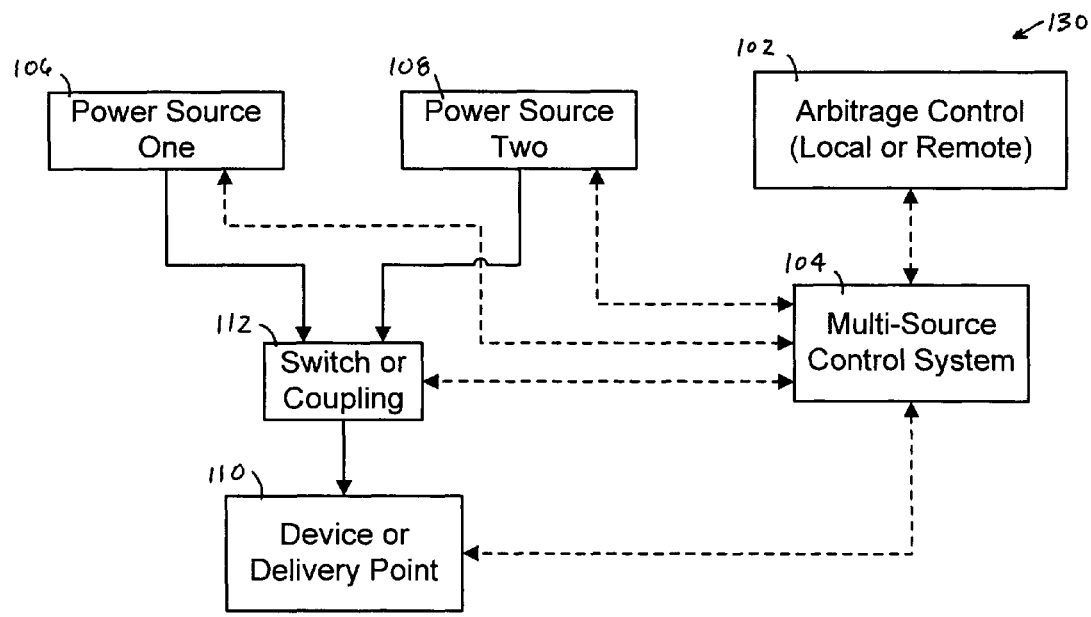
FIG. 1B is a block diagram of an arbitrage control system in accordance with another embodiment of the present invention.

Now referring to FIG. 1B, a block diagram of an arbitrage system 130 in accordance with another embodiment of the present invention is shown. The arbitrage system 130 includes an arbitrage controller 102 and a multi-source system (collectively 104-112). The previous description of the arbitrage controller 102, multi-source control system 104, power source one 106, power source two 108, device or delivery point 110 and switch or coupling 112 in reference to FIG. 1A are also applicable to FIG. 1B. As shown, power source one 106 and power source two 108 are selectively connected to device or delivery point 110 with switch or coupling 112. The multi-source control system 104 monitors and controls (as indicated by the dashed lines) power source one 106, power source two 108, device or delivery point 110, and switch or coupling 112.

Figure 1C:
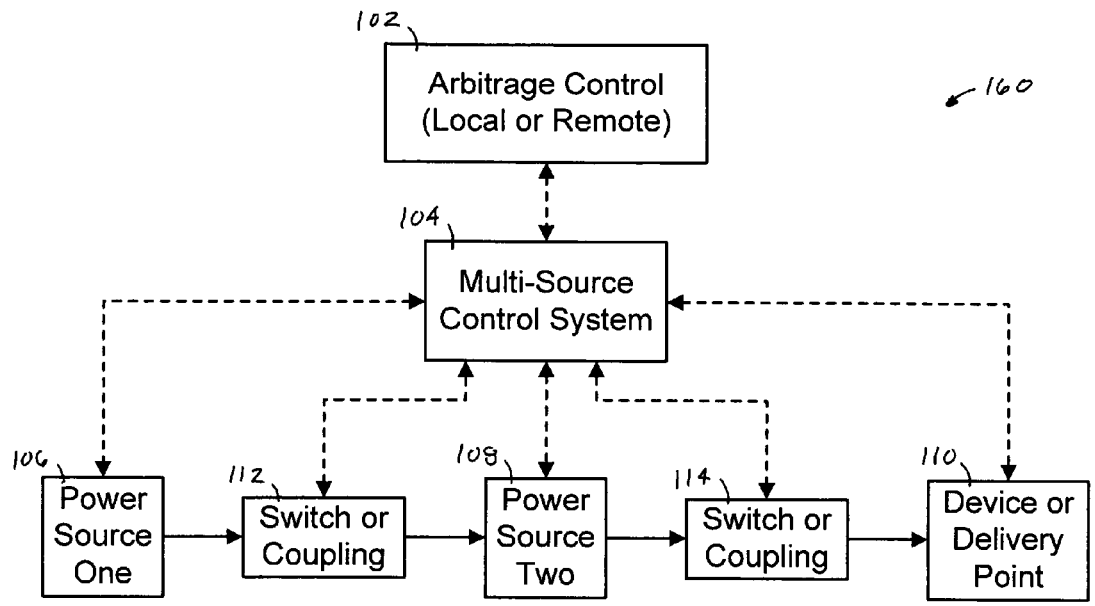
FIG. 1C is a block diagram of an arbitrage control system in accordance with another embodiment of the present invention.

Referring now to FIG. 1C, a block diagram of an arbitrage system 160 in accordance with another embodiment of the present invention is shown. The arbitrage system 160 includes an arbitrage controller 102 and a multi-source system (collectively 104-114). The previous description of the arbitrage controller 102, multi-source control system 104, power source one 106, power source two 108, device or delivery point 110 and switch or couplings 112 and 114 in reference to FIGS. 1A and 1B are also applicable to FIG. 1C. As shown, power source two 108 is selectively connected to device or delivery point 110 with switch or coupling 114. Power source one 106 is selectively connected to device or delivery point 110 with switch or coupling 112 (via power source two 108 and switch or coupling 114). When power source one 106 is connected to the device or delivery point 110, the power from power source one 106 is passed through power source two 108. For example, power source one 106 can be an engine, power source two 108 can be a motor, device or delivery point 110 can be a compressor and switch or coupling 112 and 114 can be fixed couplings with overrunning clutches to selectively transfer mechanical power from the engine 106 or motor 108 to the compressor 110. In another example, power source one 106 and power source two 108 can be two different electrical networks that are connected together via switch or coupling 112. The multi-source control system 104 monitors and controls (as indicated by the dashed lines) power source one 106, power source two 108, device or delivery point 110, and switch or couplings 112 and 114.

Figure 2:
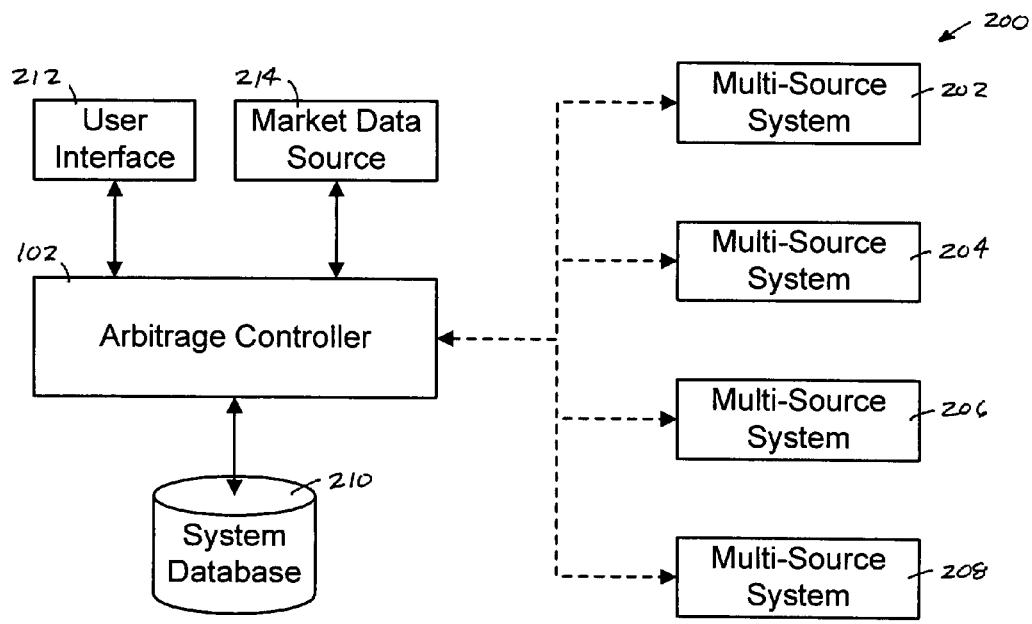
FIG. 2 is a block diagram of an arbitrage control system in accordance with another embodiment of the present invention.

Now referring to FIG. 2, a block diagram of an arbitrage system 200 in accordance with another embodiment of the present invention is shown. Arbitrage system 200 provides an arbitrage controller 102 that controls more than one multi-source system 202, 204, 206 and 208. As previously stated, each multi-source system 202, 204, 206 and 208 contains two or more power sources that are selectively connected to a device or delivery point. The multi-source systems 202, 204, 206 and 208 can be located in a single location, grouped into several locations or individually located at different locations. The arbitrage controller 102 can be located at any of the multi-source systems 202, 204, 206 or 208 or be located remotely at a central or regional control center. Depending on the arrangement, the arbitrage controller 102 can communicate with the multi-source systems 202, 204, 206 and 208 via a computer network, communications network, wireless communications link, direct connection or combination thereof. The arbitrage controller 102 is also communicably coupled to a system database 210, user interface 212 and a market data source 214.

For each multi-source system 202, 204, 206 and 208, the arbitrage controller 102 analyzes market and operational data related to the two or more available power sources and the device or delivery point, selects the power source for the device or delivery point from the two or more available power sources based on a set of financial parameters and sends one or more signals via the multi-source interface to switch the device or delivery point to the selected power source whenever the device or delivery point is not already connected to the selected power source. The market and operational data may include historical operating data, current operating data, contract data, market data or financial data obtained from the multi-source systems 202, 204, 206, 208, the system database 210, the user interface 212 or the market data source 214. The set of financial parameters may include one or more operating models, operational cost data, relative efficiency of the power sources, switching cost data, minimum return, projections, market buy/sell prices, contract buy/sell prices, fuel costs, electricity costs, target demand, maximum demand, minimum connect times for each available power source, maximum switching cycle over a specified period of time, emission limits, audible noise limits or user input data.

Figure 3A:
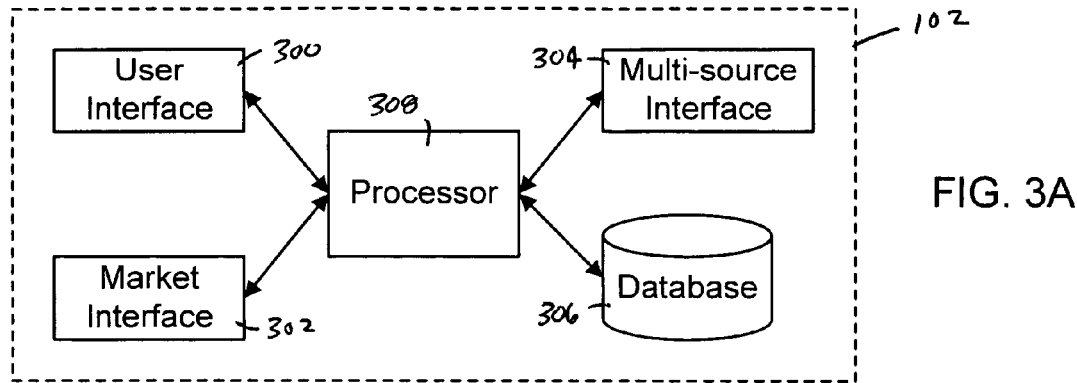
FIG. 3A is a block diagram of an arbitrage controller in accordance with one embodiment of the present invention.
Figure 3B:
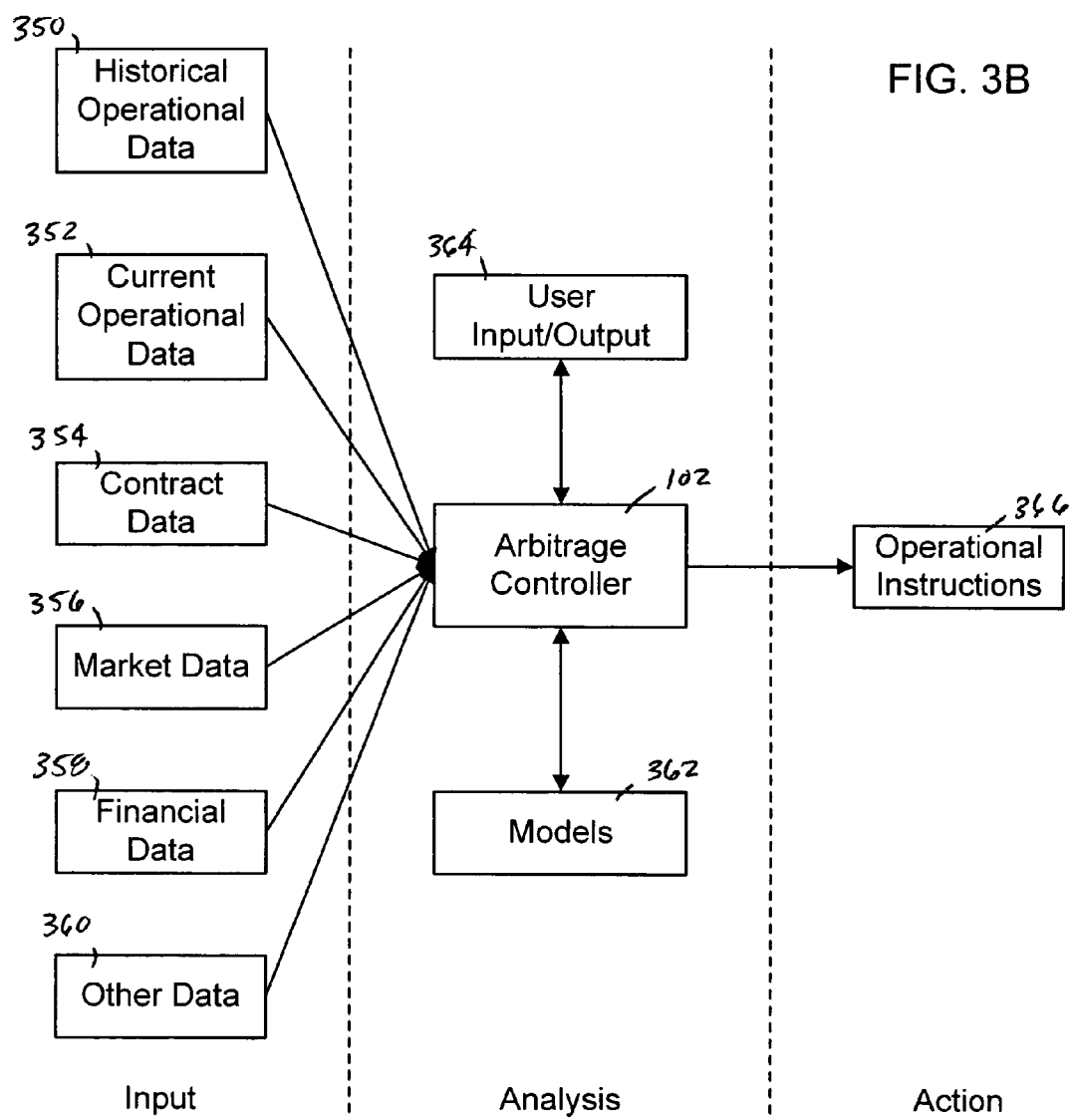
FIG. 3B is a functional diagram of an arbitrage control system in accordance with another embodiment of the present invention.

Referring now to FIGS. 3A and 3B, a block diagram (FIG. 3A) and a functional diagram (FIG. 3B) of an arbitrage controller 102 in accordance with one embodiment of the present invention are shown. The arbitrage controller 102 includes a user interface 300, a market interface 302, a multi-source interface 304, a database 306 and a processor 308. The processor 308 is communicably coupled to the user interface 300, the market interface 302, the multi-source interface 304 and the database 306. The processor 308 analyzes market and operational data related to the two or more available power sources and the device or delivery point, selects the power source for the device or delivery point from the two or more available power sources based on a set of financial parameters and sends one or more signals (operational instructions 366) via the multi-source interface 304 to switch the device or delivery point to the selected power source whenever the device or delivery point is not already connected to the selected power source. Typically, the processor 308 receives market data 356 via the market interface 302, and operational data 350 and 352 from the multi-source interface 304 or the database 306. The market and operational data may include historical operating data 350, current operating data 352, contract data 354, market data 356, financial data 358 or other data 360 obtained from the user interface 300, market interface 302, multi-source interface 304 or database 306. The set of financial parameters may include one or more operating models 362, operational cost data, switching cost data, minimum return, projections, market buy/sell prices, contract buy/sell prices, fuel costs, electricity costs, target demand, maximum demand, minimum connect times for each available power source, maximum switching cycle over a specified period of time, emission limits, audible noise limits or user input data 364. The analysis and selection process can be periodically repeated, user initiated or repeated whenever new market or operational data related to the two or more available power sources is received.

As part of the analysis, the processor 308 may determine whether it is profitable to switch the device or delivery point to the selected power source and send the one or more signals (operational instructions 366) only when it is profitable to switch the device or delivery point to the selected power source. For example, it may not be profitable to switch the power source too frequently because switching typically stresses the equipment, has some overhead cost and risk associated with it, and increases maintenance costs. Moreover, the amount of time that a particular power source is the selected source may not be long enough for the switch over to be profitable. As a result, the profitability analysis will typically project the potential revenue and costs associated with the switch and determine whether the net revenue is above specified guidelines. Naturally, a user can override a recommended switching operation or manually cause a switching operation via user interface 300. Data is input from and output to 364 the user via the user interface 300. This may input/output 364 may include updating a display based on user inputs, new data or new analysis.

The multi-source interface 304 can also be a multi-source control system or one or more interfaces to the two or more available power sources, and the device or delivery point. In these cases, the processor 308 also monitors and controls the two or more available power sources, and the device or delivery point via the multi-source interface. In addition, the multi-source interface 304 can communicate with the multi-source systems via a computer network, a communications network, a wireless communications link, a direct connection or combination thereof.

Figure 4:
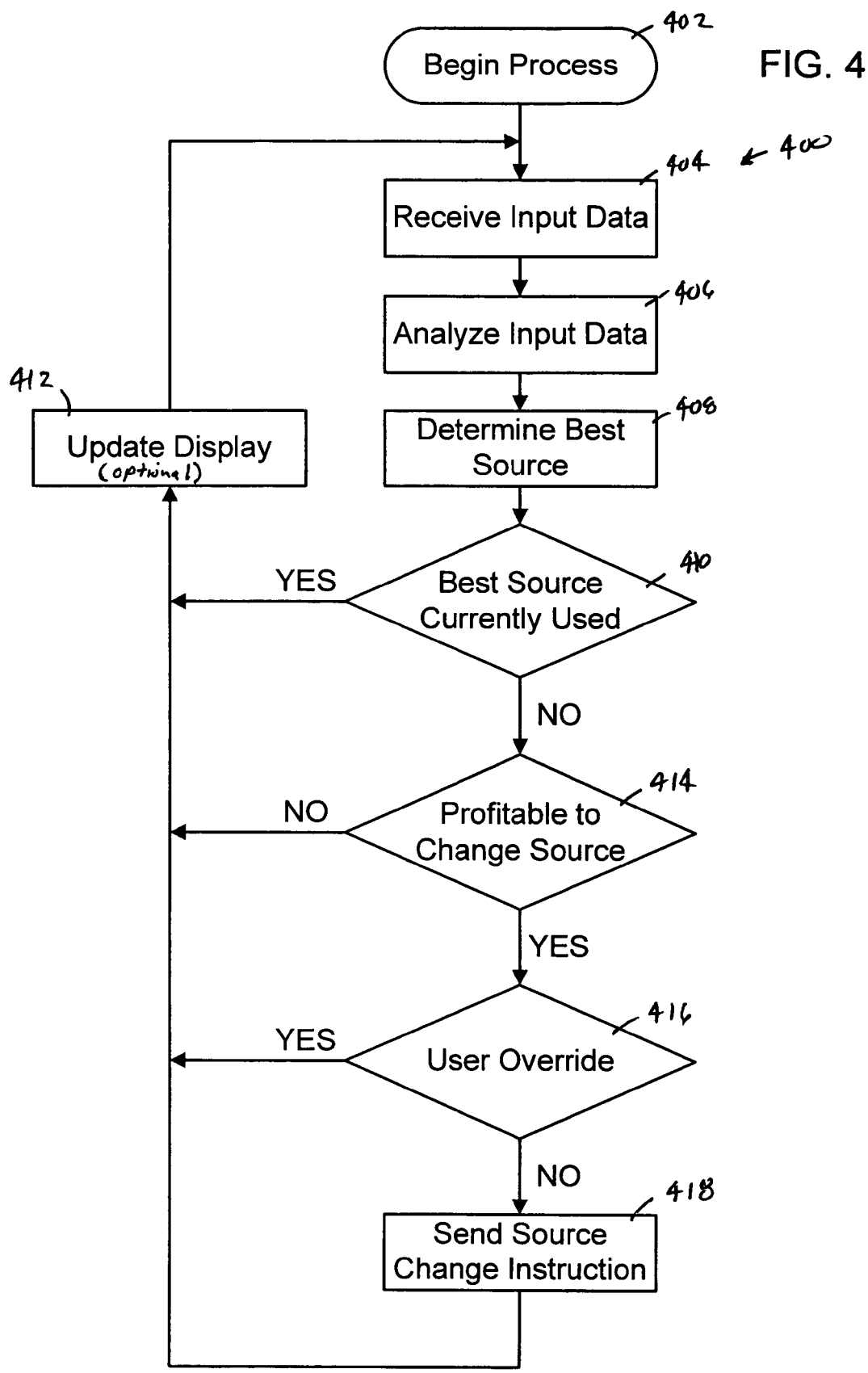
FIG. 4 is a flow chart of an arbitrage control system in accordance with one embodiment of the present invention.

Now referring to FIG. 4, a flow chart 400 of an arbitrage control system in accordance with one embodiment of the present invention is shown. The process 400 begins in block 402 and receives input data in block 404. Input data, such as market and operational data related to the two or more available power sources, and the device or delivery point is then analyzed in block 406 and the best power source for the device or delivery point is selected from the two or more available power sources based on a set of financial parameters in block 408. The market and operational data may include historical operating data, current operating data, contract data, market data, financial data or other data. The set of financial parameters may include one or more operating models, operational cost data, switching cost data, minimum return, projections, market buy/sell prices, contract buy/sell prices, fuel costs, electricity costs, target demand, maximum demand, minimum connect times for each available power source, maximum switching cycle over a specified period of time, emission limits, audible noise limits or user input data.

If the device or delivery point is already connected to the selected power source, as determined in decision block 410, a display is updated in block 412 and the process repeats the data acquisition, analysis and source selection processes in blocks 404, 406 and 408. If, however, the device or delivery point is not already connected to the selected power source, as determined in decision block 410, a determination of whether it is profitable to switch the device or delivery point to the selected power source is made. For example, it may not be profitable to switch the power source too frequently because switching typically stresses the equipment, has some overhead cost and risk associated with it, and increases maintenance costs. Moreover, the amount of time that a particular power source is the selected source may not be long enough for the switch over to be profitable. As a result, the profitability analysis will typically project the potential revenue and costs associated with the switch and determine whether the net revenue is above specified guidelines.

If it is not profitable to switch, as determined in decision block 414, a display is updated in block 412 and the process repeats the data acquisition, analysis and source selection processes in blocks 404, 406 and 408. If, however, it is profitable to switch, as determined in decision block 414, a determination of whether a user has overridden the selection is made. If there is a user override, as determined in decision block 416, an optional display is updated in block 412 and the process repeats the data acquisition, analysis and source selection processes in blocks 404, 406 and 408. If, however, there is no user override, as determined in decision block 416, one or more signals or operational instructions are sent to switch the device or delivery point to the selected power source in block 418. These signals can be sent via a computer network, a communications network, a wireless communications link, a direct connection or combination thereof. Note that the user override in decision block 416 is applicable to an automatic or semi-automatic system. The present invention can be implemented in a manually operated system wherein an operator decides to implement or send the source change instruction based on an analysis of market and operational data (blocks 406 and 408). The optional display is then updated in block 412 and the process repeats the data acquisition, analysis and source selection processes in blocks 404, 406 and 408. These steps may be repeated periodically, repeated when new data is received, repeated upon user request and performed on more that one multi-source system.

The control system of present invention will now be described in relation to two specific examples. The first example is a redundant prime mover system and is described below in relation to FIGS. 5-10. The second example is an electricity transfer station and is described below in relation to FIGS. 11-19.

The prime mover system described in relation to FIGS. 5-10 can be operated in three or four different operating modes, which increases the reliability, versatility and efficiency of the system. The redundant prime mover system includes an engine or turbine, a motor/generator and a machine, such as a compressor or pump. The four different operating modes are: driving the machine with the engine or turbine; driving the machine with the motor/generator; driving the machine and the motor/generator with the engine or turbine such that the motor/generator generates electricity; and driving the machine with both the engine or turbine and the motor/generator in a load sharing arrangement. The system can be selectively switched between these modes depending on one or more parameters. As a result, the redundant prime mover system can be set to run in the most cost effective mode or can arbitrage the price differences between electricity and the fuel used by the engine.

Figure 5:
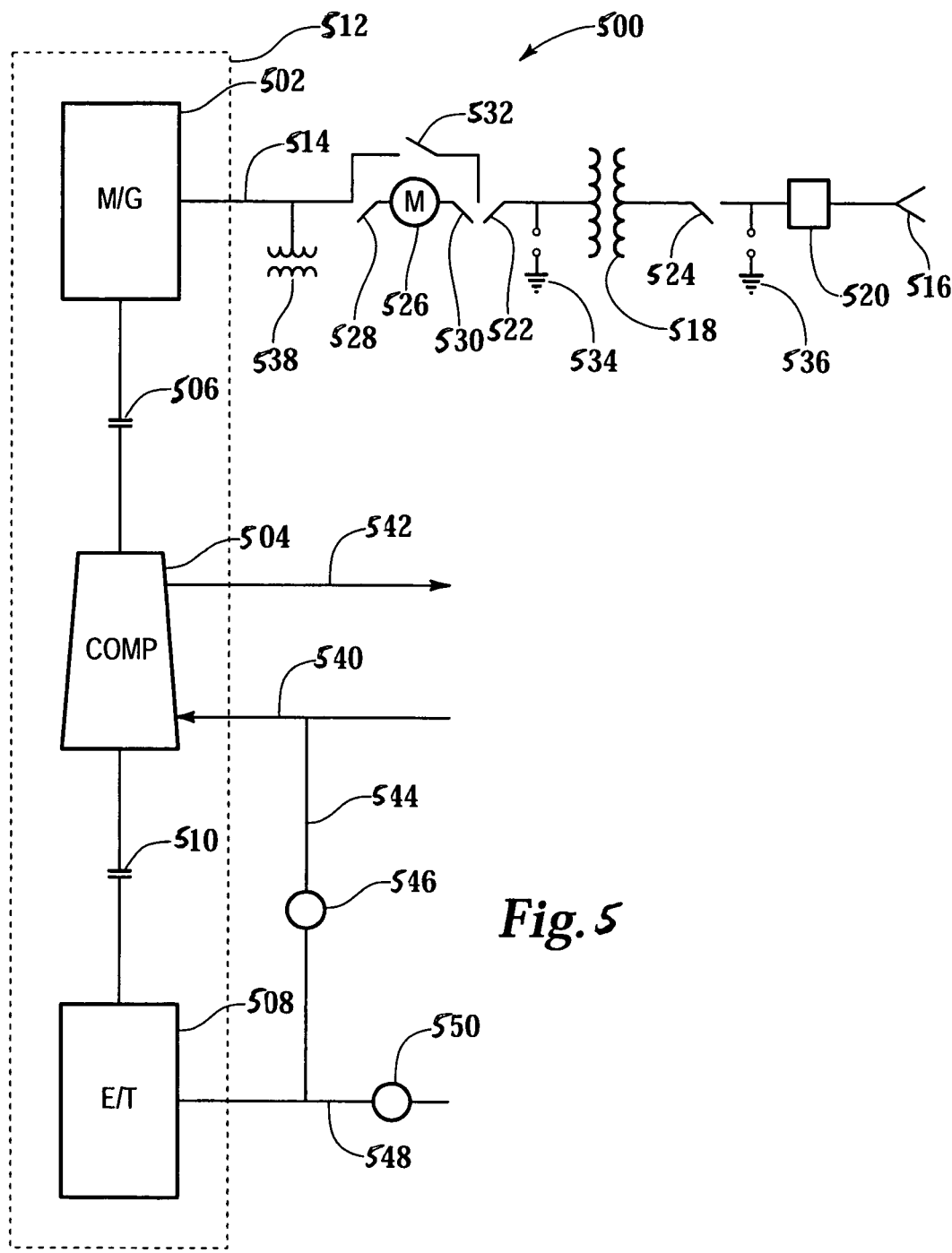
FIG. 5 is a block diagram of a redundant prime mover system in accordance with one embodiment of the present invention.

Referring now to FIG. 5, a block diagram of a redundant prime mover system 500 in accordance with one embodiment of the present invention is shown. The redundant prime mover system 500 includes a motor/generator 502 coupled to a compressor 504 with a first coupling 506 (also referred to as the "M/G-COMP Coupling") and a engine or turbine 508 coupled to the compressor 504 with a second coupling 510 (also referred to as the "E/T-COMP Coupling"). Couplings 506 and 510 can be a clutch, coupling (e.g., fixed, magnetic, etc.), gearbox or other suitable device to selectively engage/disengage the shaft of the compressor or pump 504. For example, couplings 506 and 510 can be fixed couplings with an overrunning clutch. The motor/generator 502 and engine 508 can be variable speed devices. In one embodiment of the present invention, the engine 508 is oversized so that some amount of electricity can be generated using the motor/generator 502 even with the compressor 504 is operating at peak load. In small to medium applications, the motor/generator 502, compressor 504 and engine or turbine 508 are typically mounted on a skid 512 to form a package that can be transported and set up more quickly and economically than individually installing components 502, 504, 506, 508 and 510 in the field. As will be appreciated by those skilled in the art, other equipment (not shown), such as coolers, cooler drivers, scrubbers and application specific devices, may be connected to the motor/generator 502, compressor 504 or engine 508.

The motor/generator 502 is electrically connected to an electrical network connection 514, which is used as a source of electricity to run the motor/generator 502 and drive the compressor 504 and a delivery point for the electricity generated by the motor/generator 502 when the engine 508 is supplying more output power than is required to drive the compressor 504. The exact interface between the electrical network connection 514 and the transmission or distribution system 516 will vary from one installation to another. One possible interface may include a step-down/step-up transformer 518 connected to the transmission or distribution system line 516 via breaker 520. The step-down/step-up transformer 518 can be isolated with switches 522 and 524. A meter 526 records the energy flow to and from the step-down/set-up transformer 518. Meter 526 is connected between the step-down/step-up transformer 518 and the electrical network connection 514, and may be isolated with switches 528 and 530 or bypassed with switch 532. Other metering and protective devices may also be used, such as protective relays (not shown), lightning arrestors 534 and 536, potential transformers 538, etc.

Although a compressor 504 is depicted, compressor 504 could also be a pump or other machine that is driven by large engines, turbines or motors. Input line 540 and output line 542 are connected to compressor 504. As will be appreciated by those skilled in the art, the connection of the lines 540 and 542 to the compressor 504 will also include various valves, regulators and other flow protection/regulation devices. These lines 540 and 542 may be taps off of a pipeline, such as natural gas or other petroleum product, or part of a processing plant. If input line 540 contains a product that can be used as fuel for the engine or turbine 508, a first fuel supply line 544 having a regulating valve 546 will connect the input line 540 to the engine or turbine 508. In such cases, first fuel supply line 544 will serve as the primary fuel supply for the engine or turbine 508. A second fuel supply line 548 having a regulating valve 550 will typically connect the engine or turbine 508 to an alternate fuel supply. If input line 540 does not contains a product that can be used as fuel for the engine or turbine 508, second fuel supply line 548 will be the primary source of fuel to the engine or turbine 508.

Figure 6:
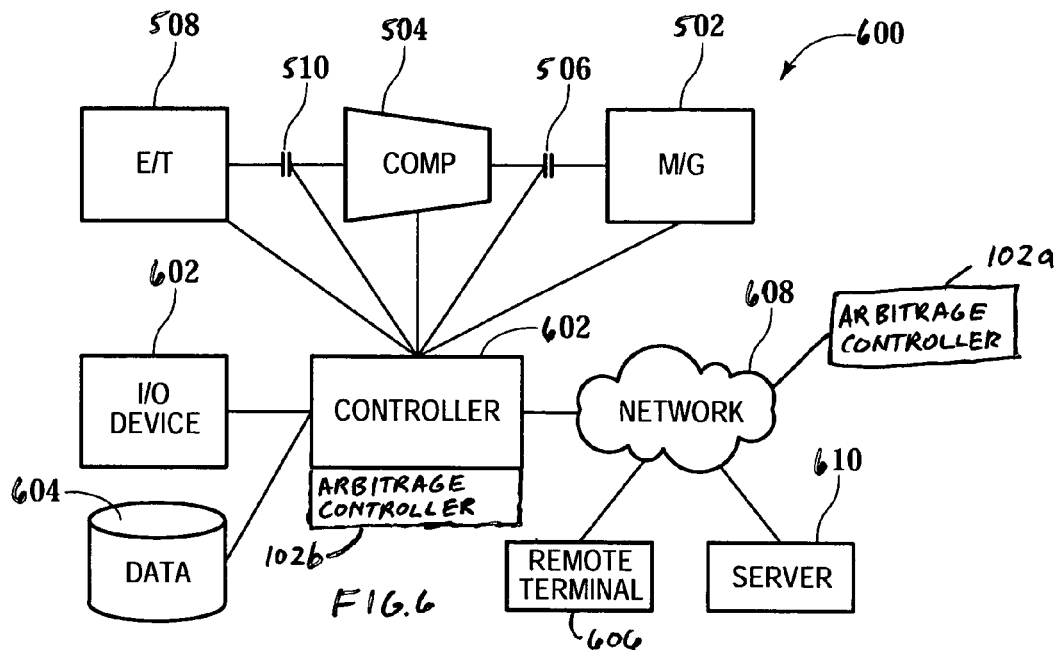
FIG. 6 is a block diagram of a control system for a redundant prime mover system in accordance with one embodiment of the present invention.

Now referring to FIG. 6, a block diagram of a control system 600 for a redundant prime mover system in accordance with one embodiment of the present invention is shown. A controller 602 is communicably coupled to the engine or turbine 508, the second coupling 510, the compressor 504, the first coupling 506 and the motor/generator 502. The controller 602 monitors and controls the operation of these components 502, 504, 506, 508 and 510. The controller 602 can be installed on the skid 512 (FIG. 5) or in a remotely located control room or building (not shown). The controller 602 may also be communicably coupled to one or more input/output ("I/O") devices 602 and data storage devices 604. The system 600 can be controlled and monitored from the controller 602 or from a remote terminal 606 communicably coupled to the controller 602 via a network 608 or a direct communication link (not shown). The controller 602 can also send and retrieve data or commands from a remote server 610 communicably coupled to the controller 602 via network 608.

In this embodiment, the two or more available power sources 106 and 108 (FIG. 1) include an engine 508 and a motor/generator 502. The device or delivery point 110 (FIG. 1) includes a machine (compressor) 504 and/or an electrical connection. The engine 508 is coupled to the machine 504. The motor/generator 502 is coupled to the machine 504 and the electrical network connection. The arbitrage controller 102 can be located with, combined with or integrated in the controller 602 as illustrated by arbitrage controller 102b. Alternatively, the arbitrage controller 102 can be at a remote site as illustrated by arbitrage controller 102a and communicate with the controller 602 via network 608.

Figure 7:
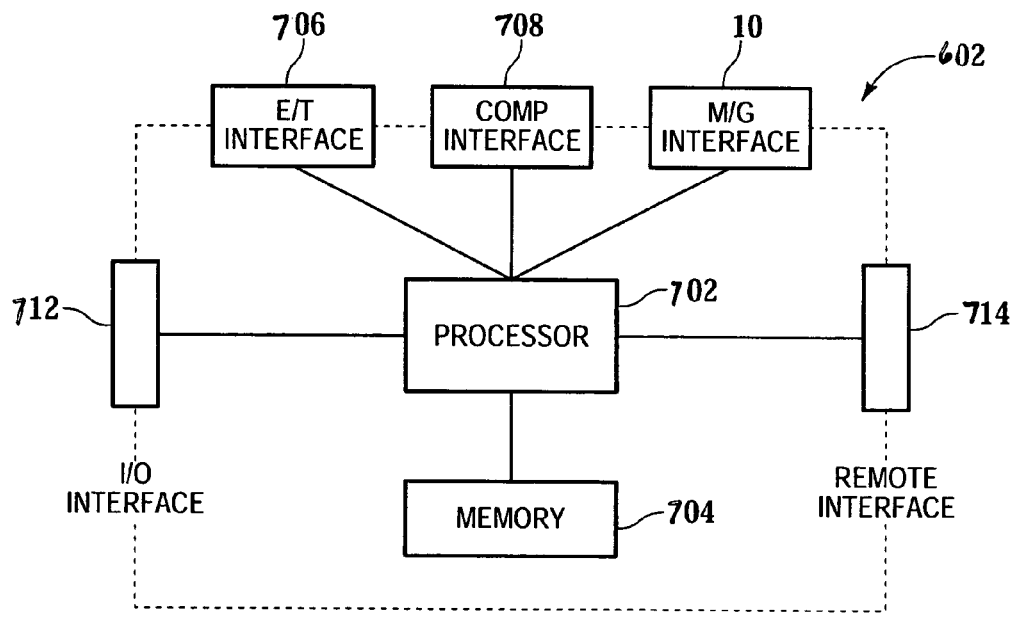
FIG. 7 is a block diagram of a controller for a redundant prime mover system in accordance with one embodiment of the present invention.

Referring now to FIG. 7, a block diagram of a controller 602 for a redundant prime mover system in accordance with one embodiment of the present invention is shown. The controller 602 includes one or more processors 702 communicably coupled to a memory 704. Memory 704 can be read only memory ("ROM") and/or random access memory ("RAM"). The one or more processors 702 are communicably coupled to an engine control interface 706, a compressor control interface 708, a motor/generator control interface 710, an I/O interface 712 and a remote interface 714. The controller 602 controls and monitors the engine or turbine 508 (FIG. 6) using the engine control interface 706. The second coupling 510 (FIG. 6) can be automatically controlled (e.g., fixed coupling with an overrunning clutch), or controlled and monitored using engine control interface 706, the compressor interface 708 or a separate interface (not shown). Similarly, the controller 602 controls and monitors the motor/generator 502 (FIG. 6) using the motor/generator control interface 710. The first coupling 506 (FIG. 6) can be automatically controlled (e.g., fixed coupling with an overrunning clutch), or controlled and monitored using motor/generator control interface 710, the compressor interface 708 or a separate interface (not shown). The controller 602 controls and monitors the compressor 504 (FIG. 6) using the compressor control interface 708. Note that some or all of these three interfaces 706, 708 and 710 can be combined into a single interface. Moreover, each interface 706, 708 and 710 can be individually wired connections. The I/O interface 712 communicably couples the processor 720 to the I/O devices 602 (FIG. 6) and data storage devices 604 (FIG. 6). Similarly, the remote interface 714 communicably couples the processor 720 to the remote terminal 606 (FIG. 6) and data server 610 (FIG. 6). The I/O interface 712 and remote interface 714 can be a serial, parallel, universal serial bus ("USB"), Ethernet, telephone or other type of computer interface. As will be appreciated by those skilled in the art, the interfaces 706, 708, 710, 712 and 714 include the necessary hardware, software and drivers to establish communication between the processor and the connected devices.

Figure 8A:
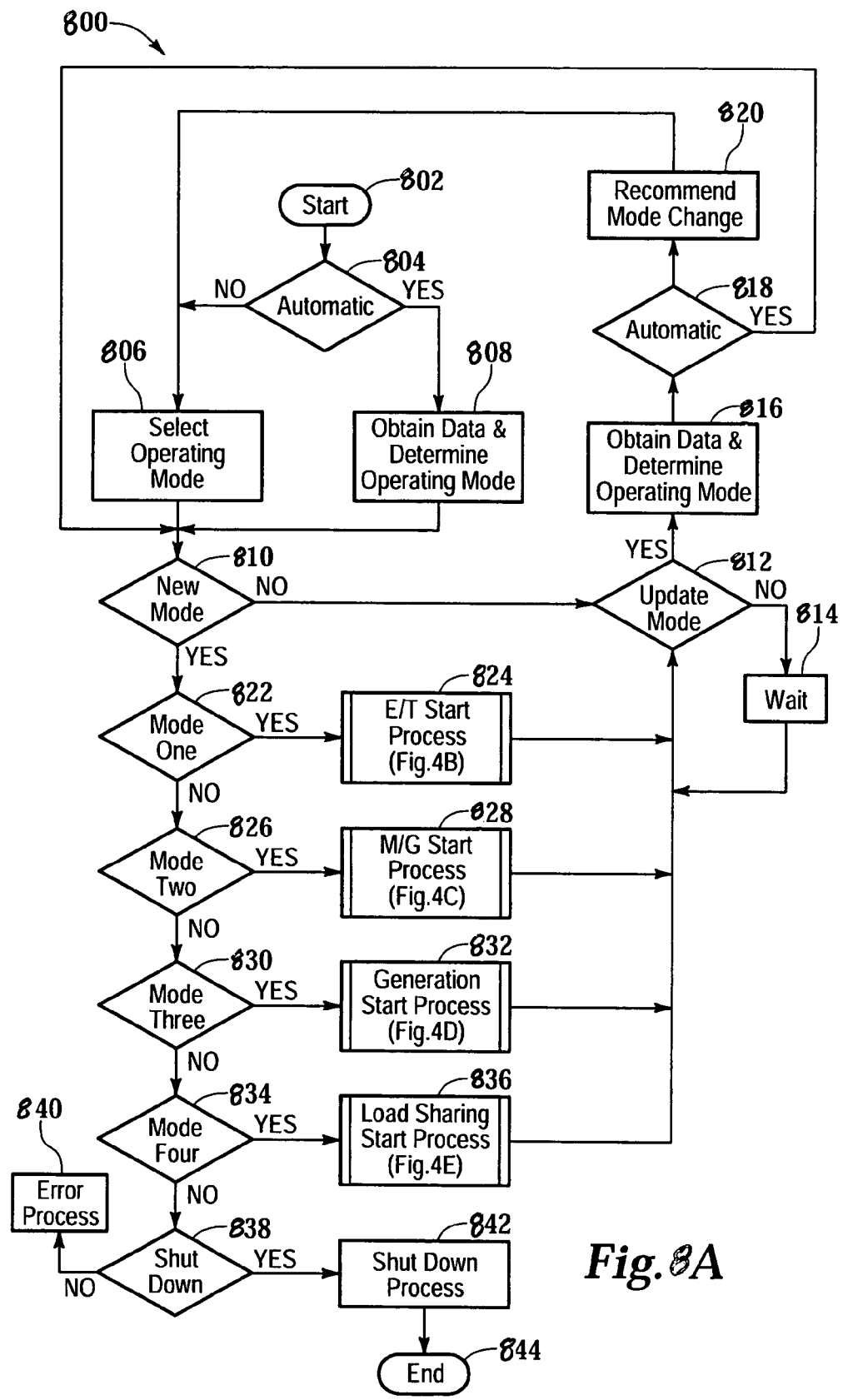
FIGS. 8A, 8B, 8C, 8D and 8E are flowcharts of a control process for a redundant prime mover system in accordance with one embodiment of the present invention.

Now referring to FIG. 8A, a flowchart of a control process 800 for a redundant prime mover system in accordance with one embodiment of the present invention is shown. The control process 800 starts in block 802 and the system determines whether it is in manual or automatic mode in decision block 804. If the system is not in automatic mode, as determined in decision block 804, an operating mode is selected in block 806. If the system is in automatic mode, as determined in decision block 804, one or more parameters, such as operational data, are obtained and the proper operating mode is determined in block 808. The one or more parameters may include an estimated operational cost for the engine, an estimated operational cost for the motor/generator, a selling price for electricity, a fuel cost for the engine, an electricity cost for the motor/generator, a time period, an emission limit, an audible noise limit, or any other operational data.

Once the operating mode has been selected or determined in either block 806 or block 808, and if the operating mode is new (initial operating mode or different from the current operating mode), as determined in decision block 810, and if it is not time to re-determine the operating mode, as determined in decision block 812, the system waits a predetermined amount of time in block 814 before it re-determines the operating mode. If, however, it is time to re-determine the operating mode, as determined in decision block 812, operating data is obtained and the proper operating mode is determined in block 816. If the system is set to automatic, as determined in decision block 818, the process loops back to decision block 810 to determine whether the re-determined operating mode is new. If, however, the system is not set to automatic, as determined in decision block 818, the system recommends that the operating mode be changed in block 820 and then loops back to block 806 where the operating mode is selected. If a new operating mode is not selected in block 806, the re-determination process can be repeated.

The control process 800 of the present invention operates the motor/generator 502 (FIGS. 5 and 6), compressor 504 (FIGS. 5 and 6) and engine 508 (FIGS. 5 and 6) in three or four operating modes. The operating modes can be selected manually or automatically. The first operating mode drives the machine with the engine. The second operating mode drives the machine with the motor/generator. The third operating mode drives the machine and the motor/generator with the engine such that the motor/generator generates electricity for delivery to the electrical network connection. Alternatively, the third operating mode drives the machine with both the engine and the motor/generator. This alternate operating mode can also be included as a fourth operating mode.

For example, the present invention can be set to operate in the most cost efficient manner using three operating modes based on these parameters: a first estimated operational cost for the engine, a second estimated operational cost for the engine, an estimated operational cost for the motor/generator and a selling price for the electricity. The first estimated operational cost for the engine corresponds to the operating costs to drive the compressor 504 (FIGS. 5 and 6) with the engine 508 (FIGURES 5 and 6). The second estimated operational cost for the engine corresponds to the incremental cost to drive the compressor 504 (FIGS. 5 and 6) and the motor/generator 502 (FIGS. 5 and 6). The first operating mode occurs whenever a first estimated operational cost for the engine 508 (FIGS. 5 and 6) is less than an estimated operational cost for the motor/generator 502 (FIGS. 5 and 6). The second operating mode occurs whenever an estimated operational cost for the motor/generator 502 (FIGS. 5 and 6) is less than or equal to the first estimated operational cost for the engine 508 (FIGS. 5 and 6). The third operating mode occurs whenever a selling price for the electricity is greater than the second estimated operational cost for the engine 508 (FIGS. 5 and 6). The processor 702 (FIG. 7) can calculate the first operational cost for the engine 508 (FIGS. 5 and 6), second operational cost for the engine 508 (FIGS. 5 and 6), operational cost for the motor/generator 502 (FIGS. 5 and 6) and selling price for the electricity using current and/or historical data. These operating modes can be manually controlled, preprogrammed, or determined in real-time, near real-time or from historical and/or projected data. For example, the operating modes could be triggered by selected time periods to operate in the first operating mode during the summer months (excluding electrical peaking periods), the second operating mode during the remaining months, and the third operating mode during the electrical peaking periods.

If the operating mode is new (initial operating mode or different from the current operating mode), as determined in decision block 810, and the new operating mode is the first operating mode, as determined in decision block 822, the E/T start process is executed in block 824. The E/T start process 824 is described below in reference to FIG. 8B. After completion of the E/T start process in block 824, the process loops back to decision block 812 to determine whether it is time to re-determine or update the operating mode. If, however, the new operating mode is not the first operating mode, as determined in decision block 822, and the new operating mode is the second operating mode, as determined in decision block 826, the M/G start process is executed in block 828. The M/G start process 828 is described below in reference to FIG. 8C. After completion of the M/G start process in block 828, the process loops back to decision block 812 to determine whether it is time to re-determine or update the operating mode. If, however, the new operating mode is not the second operating mode, as determined in decision block 826, and the new operating mode is the third operating mode, as determined in decision block 830, the generation start process is executed in block 832. The generation start process 832 is described below in reference to FIG. 8D. After completion of the generation start process in block 832, the process loops back to decision block 812 to determine whether it is time to re-determine or update the operating mode. If, however, the new operating mode is not the third operating mode, as determined in decision block 830, and the new operating mode is the fourth operating mode, as determined in decision block 834, the load sharing start process is executed in block 836. The load sharing start process 836 is described below in reference to FIG. 8E. After completion of the load sharing start process in block 836, the process loops back to decision block 812 to determine whether it is time to re-determine or update the operating mode. If, however, the new operating mode is not the fourth operating mode, as determined in decision block 834, and the shut down process has not been ordered, as determined in decision block 838, a error process will commence in block 840. The error process 840 may include various system checks, diagnostics and reporting functions, and may or may not initiate a shut down process or "safe" operating mode. If, however, the shut down process has been ordered, as determined in decision block 838, the shut down process will be executed in block 842 and the process ends in block 844.

Figure 8B:
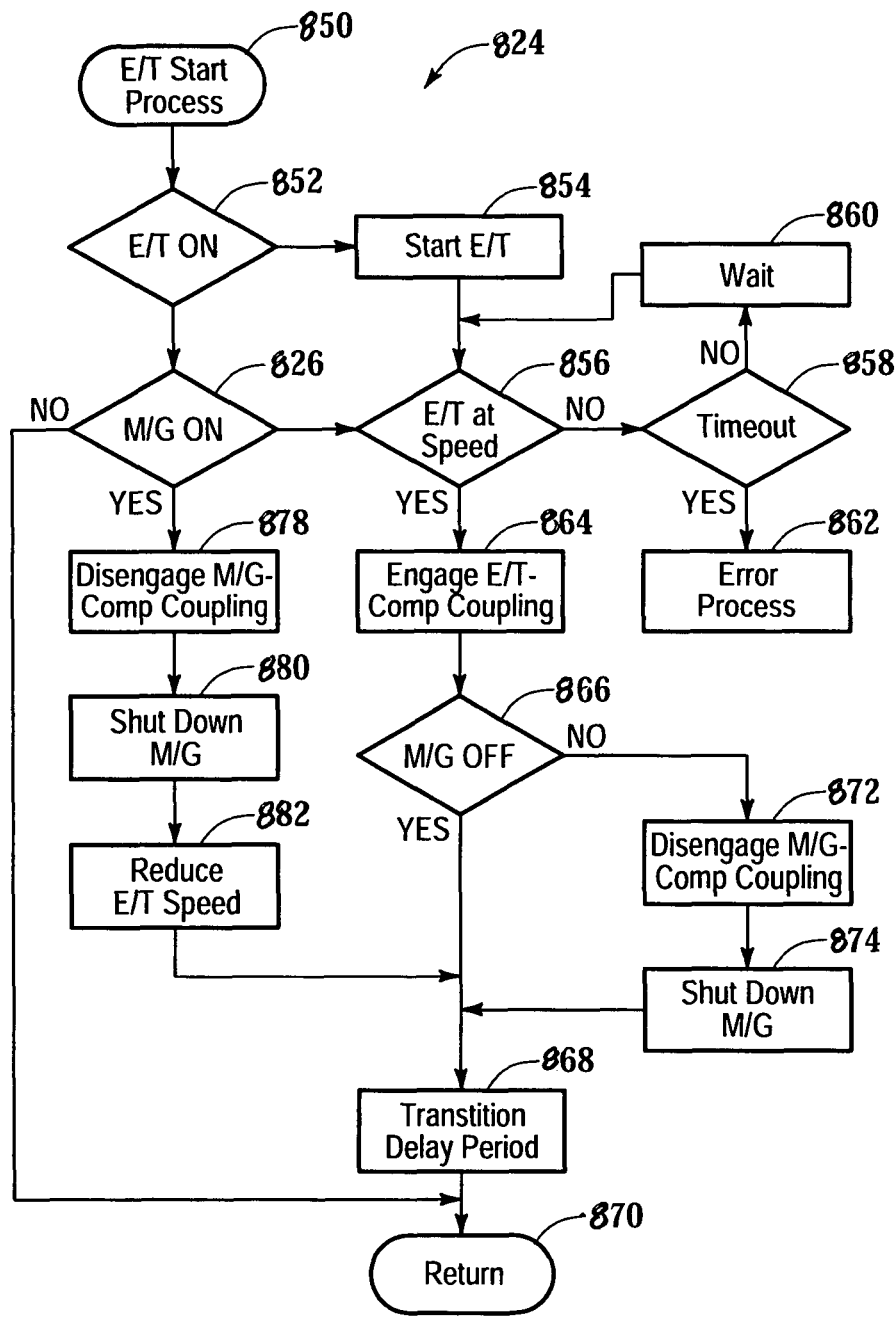

Referring now to FIG. 8B, a flowchart of the engine or turbine start process 824 of FIG. 8A for a redundant prime mover system in accordance with one embodiment of the present invention is shown. The E/T start process 824 begins in block 850. If the engine or turbine 508 (FIG. 5) is not on, as determined in decision block 852, the engine or turbine 508 (FIG. 5) is started in block 854. If the engine or turbine 508 (FIG. 5) is not up to the proper speed to engage the E/T-COMP coupling 510 (FIG. 5), as determined in decision block 856, and the start process has not exceeded a specified period of time ("timed out"), as determined in decision block 858, the process will wait in block 860 for a period of time before the engine or turbine 508 (FIG. 5) speed is checked again in decision block 856. If, however, the start process has timed out, as determined in decision block 858, an error process will be initiated in block 862. The error process 862 may include various system checks, diagnostics and reporting functions. The error process 862 may also shut the engine or turbine 508 (FIG. 5) down and disable the E/T start process 824 and generation start process 832 until a technician services the control system and the engine or turbine 508 (FIG. 5). If the engine or turbine 508 (FIG. 5) is up to the proper speed, as determined in decision block 856, the E/T-COMP coupling 510 (FIG. 5) is engaged in block 864. Note that depending on the type of coupling used, the coupling may always be engaged and it is an overrunning clutch that is actually engaged or disengaged. If the motor/generator 502 (FIG. 5) is not on, as determined in decision block 866, the system suspends further processing until a transition delay period has expired in block 868 and the process returns in block 870. The transition delay period can be a minimum time to run the engine or turbine 508 (FIG. 5) in the first operating mode based on the costs and equipment wear and tear associated with changing operating modes. For example, the system may be specified to prevent changing operating modes every few minutes or even every hour. Alternatively, there may be a maximum number of changes allowed per day, week or month.

If, however, the motor/generator 502 (FIG. 5) is on, as determined in decision block 866, the M/G-COMP coupling 506 (FIG. 5) is disengaged in block 872 and the motor/generator 502 (FIG. 5) is shut down in block 874. Note that depending on the type of coupling used, the coupling may always be engaged and it is an overrunning clutch that is actually engaged or disengaged. As before, the system suspends further processing until the transition delay period has expired in block 868 and returns to the main process (FIG. 8) in block 870. If, however, the engine or turbine 508 (FIG. 5) is on, as determined in decision block 852, and the motor/generator 502 (FIG. 5) is not on, as determined in decision block 876, the process returns in block 870 to the main process (FIG. 8) because the system is already in the first operating mode. If, however, the motor/generator 502 (FIG. 5) is on, as determined in decision block 876, the M/G-COMP coupling 506 (FIG. 5) is disengaged in block 878 and the motor/generator 502 (FIG. 5) is shut down in block 880. Note that depending on the type of coupling used, the coupling may always be engaged and it is an overrunning clutch that is actually engaged or disengaged. The speed of the engine or turbine 508 (FIG. 5) is reduced in block 882 to only drive the compressor instead of both the compressor and motor/generator. The system suspends further processing until the transition delay period has expired in block 868 and returns in block 870 to the main process (FIG. 8).

Figure 8C:
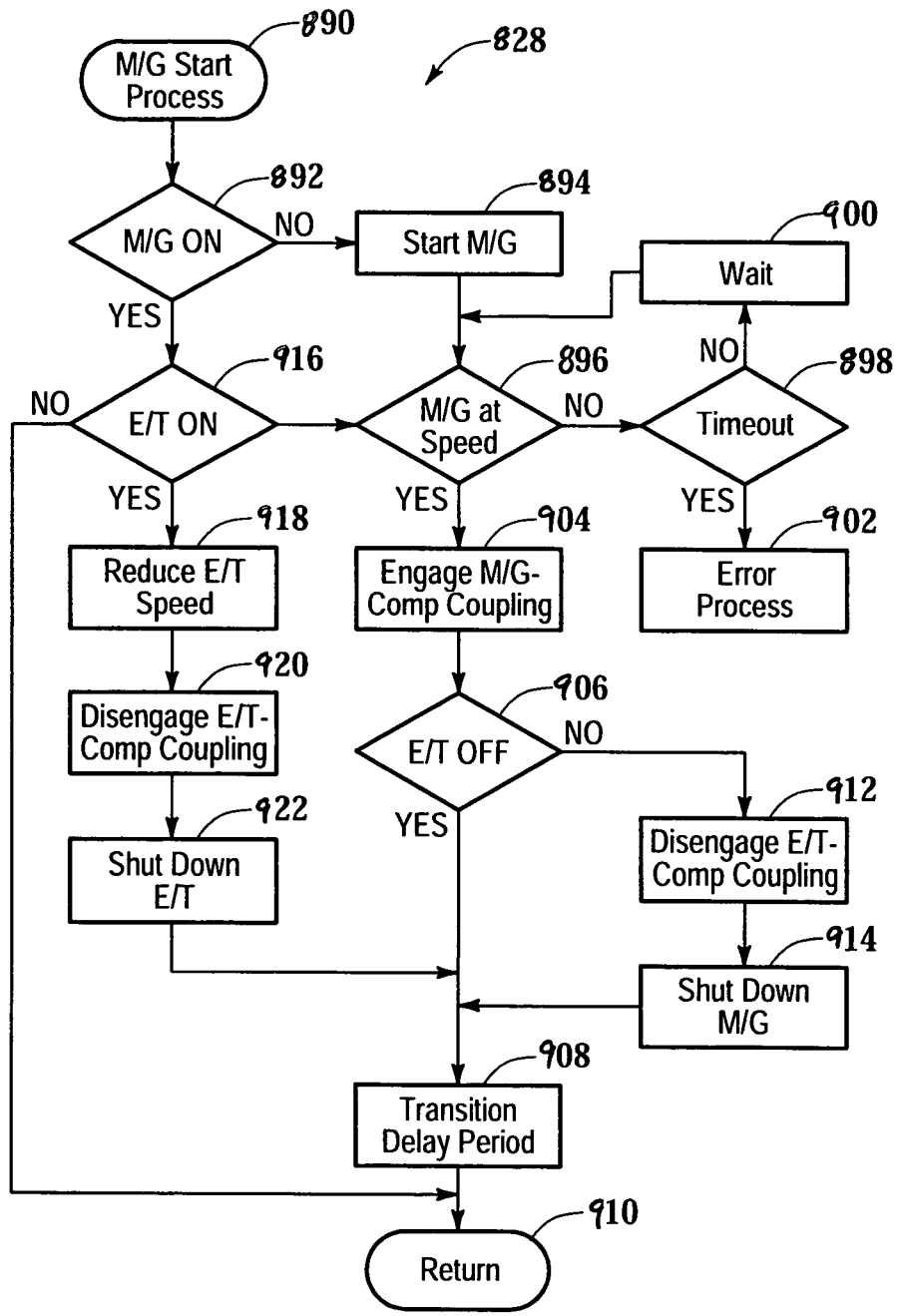

Now referring to FIG. 8C, a flowchart of the motor/generator start process 828 of FIG. 8A for a redundant prime mover system in accordance with one embodiment of the present invention is shown. The M/G start process 828 begins in block 890. If the motor/generator 502 (FIG. 5) is not on, as determined in decision block 892, the motor/generator 502 (FIG. 5) is started in block 894. If the motor/generator 502 (FIG. 5) is not up to the proper speed to engage the M/G-COMP coupling 506 (FIG. 5), as determined in decision block 896, and the start process has not timed out, as determined in decision block 898, the process will wait in block 900 for a period of time before the motor/generator 502 (FIG. 5) speed is checked again in decision block 896. If, however, the start process has timed out, as determined in decision block 898, an error process will be initiated in block 902. The error process 902 may include various system checks, diagnostics and reporting functions. The error process 902 may also shut the motor/generator 502 (FIG. 5) down and disable the M/G start process 828 and generation start process 832 until a technician services the control system and the motor/generator 502 (FIG. 5). If the motor/generator 502 (FIG. 5) is up to the proper speed, as determined in decision block 896, the M/G-COMP coupling 506 (FIG. 5) is engaged in block 904. Note that depending on the type of coupling used, the coupling may always be engaged and it is an overrunning clutch that is actually engaged or disengaged. If the motor/generator 502 (FIG. 5) is not on, as determined in decision block 906, the system suspends further processing until a transition delay period has expired in block 908 and the process returns in block 910. The transition delay period can be a minimum time to run the motor/generator 502 (FIG. 5) in the first operating mode based on the costs and equipment wear and tear associated with changing operating modes. For example, the system may be specified to prevent changing operating modes every few minutes or even every hour. Alternatively, there may be a maximum number of changes allowed per day, week or month.

If, however, the motor/generator 502 (FIG. 5) is on, as determined in decision block 906, the E/T-COMP coupling 510 (FIG. 5) is disengaged in block 912 and the engine or turbine 508 (FIG. 5) is shut down in block 914. Note that depending on the type of coupling used, the coupling may always be engaged and it is an overrunning clutch that is actually engaged or disengaged. As before, the system suspends further processing until the transition delay period has expired in block 908 and returns to the main process (FIG. 8) in block 910. If, however, the motor/generator 502 (FIG. 5) is on, as determined in decision block 892, and the engine or turbine 508 (FIG. 5) is not on, as determined in decision block 916, the process returns in block 910 to the main process (FIG. 8) because the system is already in the second operating mode. If, however, the engine or turbine 508 (FIG. 5) is on, as determined in decision block 916, the speed of the engine or turbine 508 (FIG. 5) is reduced in block 918 so that the system is not generating electricity. The E/T-COMP coupling 510 (FIG. 5) is disengaged in block 920 and the engine or turbine 508 (FIG. 5) is shut down in block 922. Note that depending on the type of coupling used, the coupling may always be engaged and it is an overrunning clutch that is actually engaged or disengaged. The system suspends further processing until the transition delay period has expired in block 908 and returns in block 910 to the main process (FIG. 8).

Figure 8D:
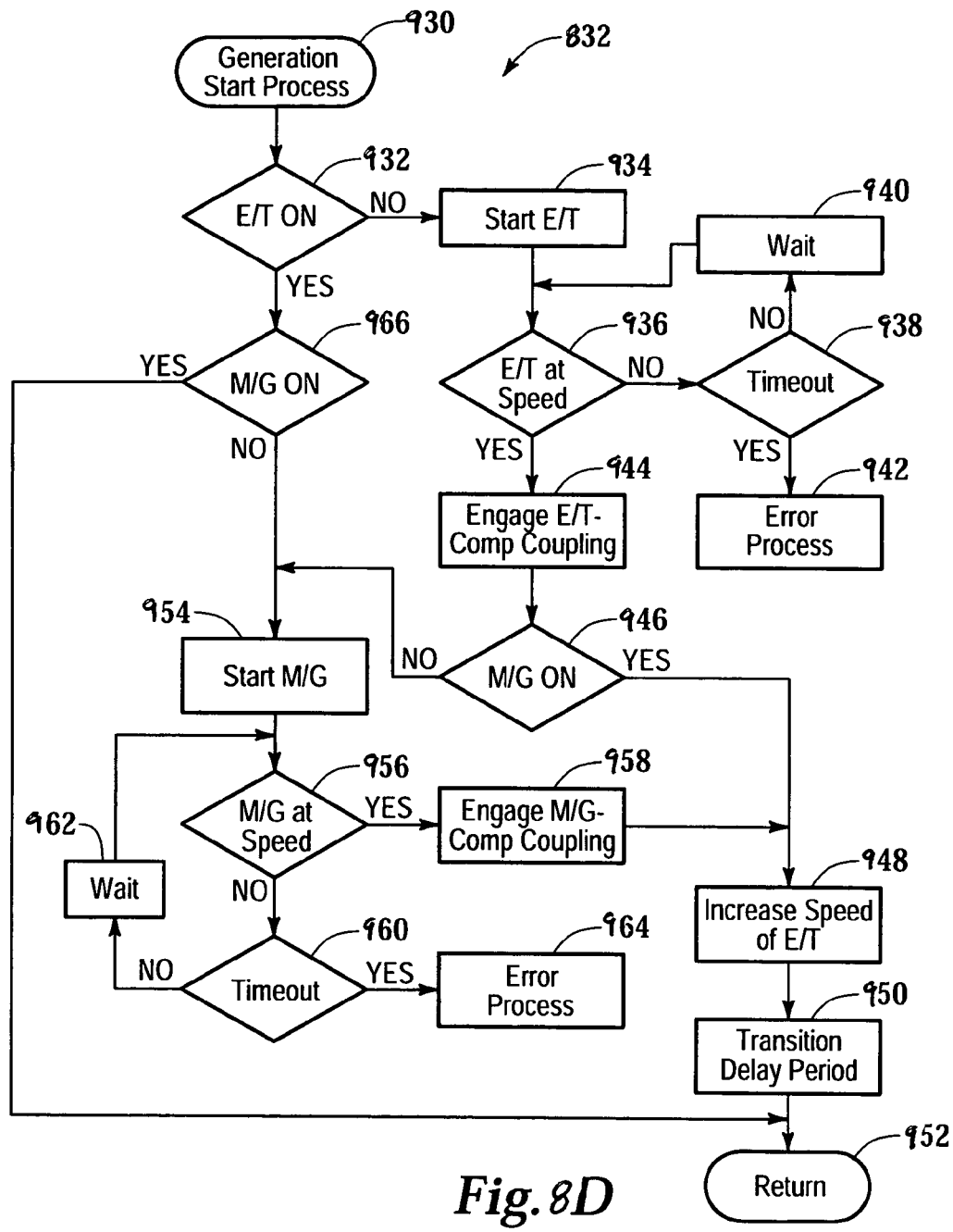

Referring now to FIG. 8D, a flowchart of the generation start process 832 of FIG. 8A for a redundant prime mover system in accordance with one embodiment of the present invention is shown. The generation start process 832 begins in block 930. If the engine or turbine 508 (FIG. 5) is not on, as determined in decision block 932, the engine or turbine 508 (FIG. 5) is started in block 934. If the engine or turbine 508 (FIG. 5) is not up to the proper speed to engage the E/T-COMP coupling 510 (FIG. 5), as determined in decision block 936, and the start process has not timed out, as determined in decision block 938, the process will wait in block 940 for a period of time before the engine or turbine 508 (FIG. 5) speed is checked again in decision block 936. If, however, the start process has timed out, as determined in decision block 938, an error process will be initiated in block 942. The error process 942 may include various system checks, diagnostics and reporting functions. The error process 942 may also shut the engine or turbine 508 (FIG. 5) down and disable the E/T start process 824, generation start process 832 and load sharing start process 836 until a technician services the control system and the engine or turbine 508 (FIG. 5). If the engine or turbine 508 (FIG. 5) is up to the proper speed, as determined in decision block 936, the E/T-COMP coupling 510 (FIG. 5) is engaged in block 944. Note that depending on the type of coupling used, the coupling may always be engaged and it is an overrunning clutch that is actually engaged or disengaged. If the motor/generator 502 (FIG. 5) is on, as determined in decision block 946, the speed of the engine or turbine 508 (FIG. 5) is increased in block 948 so that the system generates electricity. The system suspends further processing until a transition delay period has expired in block 950 and the process returns in block 952. The transition delay period can be a minimum time to run the motor/generator 502 (FIG. 5) and engine or turbine 508 (FIG. 5) in the third operating mode based on the costs and equipment wear and tear associated with changing operating modes. For example, the system may be specified to prevent changing operating modes every few minutes or even every hour. Alternatively, there may be a maximum number of changes allowed per day, week or month.

If, however, the motor/generator 502 (FIG. 5) is not on, as determined in decision block 946, the motor/generator 502 (FIG. 5) is started in block 954. If the motor/generator 502 (FIG. 5) is up to the proper speed, as determined in decision block 956, the M/G-COMP coupling 506 (FIG. 5) is engaged in block 958 and the speed of the engine or turbine 508 (FIG. 5) is increased in block 948 so that the system generates electricity. Note that depending on the type of coupling used, the coupling may always be engaged and it is an overrunning clutch that is actually engaged or disengaged. The system suspends further processing until a transition delay period has expired in block 950 and the process returns in block 952. If, however, the motor/generator 502 (FIG. 5) is not up to the proper speed to engage the M/G-COMP coupling 506 (FIG. 5), as determined in decision block 956, and the start process has not timed out, as determined in decision block 960, the process will wait in block 962 for a period of time before the motor/generator 502 (FIG. 5) speed is checked again in decision block 956. If, however, the start process has timed out, as determined in decision block 960, an error process will be initiated in block 964. The error process 964 may include various system checks, diagnostics and reporting functions. The error process 964 may also shut the motor/generator 502 (FIG. 5) down and disable the M/G start process 828, generation start process 832 and load sharing start process 836 until a technician services the control system and the motor/generator 502 (FIG. 5).

If, however, the engine or turbine 508 (FIG. 5) is on, as determined in decision block 932, and the motor/generator 502 (FIG. 5) is on, as determined in decision block 966, the process returns in block 952 to the main process (FIG. 8) because the system is already in the third operating mode. If, however, the motor/generator 502 (FIG. 5) is not on, as determined in decision block 966, the motor/generator 502 (FIG. 5) is started in block 954 and the process continues as previously described.

Figure 8E:
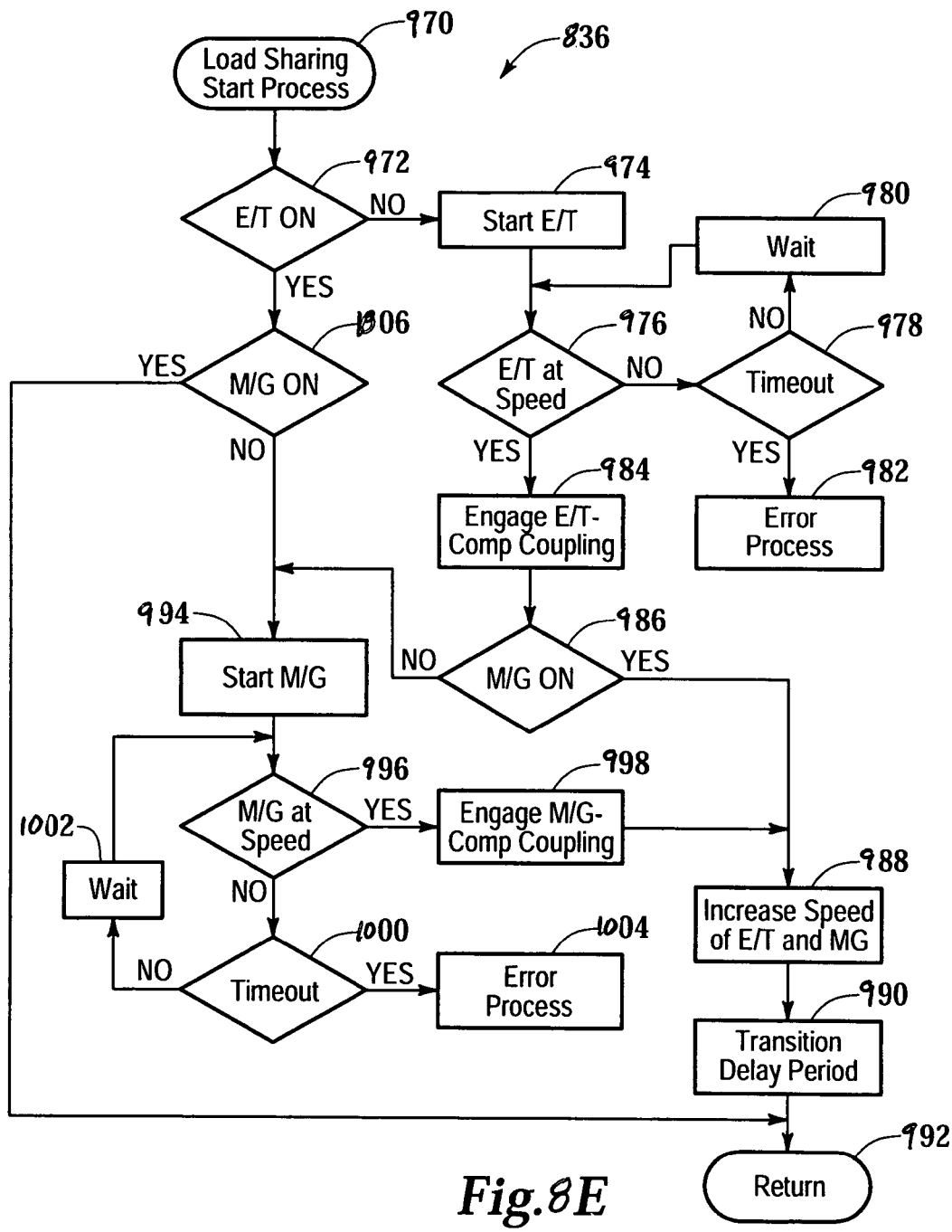

Referring now to FIG. 8E, a flowchart of the load sharing start process 836 of FIG. 8A for a redundant prime mover system in accordance with one embodiment of the present invention is shown. The load sharing start process 836 begins in block 970. If the engine or turbine 508 (FIG. 5) is not on, as determined in decision block 972, the engine or turbine 508 (FIG. 5) is started in block 974. If the engine or turbine 508 (FIG. 5) is not up to the proper speed to engage the E/T-COMP coupling 510 (FIG. 5), as determined in decision block 976, and the start process has not timed out, as determined in decision block 978, the process will wait in block 980 for a period of time before the engine or turbine 508 (FIG. 5) speed is checked again in decision block 976. If, however, the start process has timed out, as determined in decision block 978, an error process will be initiated in block 982. The error process 982 may include various system checks, diagnostics and reporting functions. The error process 982 may also shut the engine or turbine 508 (FIG. 5) down and disable the E/T start process 824, generation start process 832 and load sharing start process 836 until a technician services the control system and the engine or turbine 508 (FIG. 5). If the engine or turbine 508 (FIG. 5) is up to the proper speed, as determined in decision block 976, the E/T-COMP coupling 510 (FIG. 5) is engaged in block 984. Note that depending on the type of coupling used, the coupling may always be engaged and it is an overrunning clutch that is actually engaged or disengaged. If the motor/generator 502 (FIG. 5) is on, as determined in decision block 986, the output of the engine or turbine 508 (FIG. 5) and motor/generator 502 (FIG. 5) are adjusted to share the load of the compressor 504 in block 988. The system suspends further processing until a transition delay period has expired in block 990 and the process returns in block 992. The transition delay period can be a minimum time to run the motor/generator 502 (FIG. 5) and engine or turbine 508 (FIG. 5) in the fourth operating mode based on the costs and equipment wear and tear associated with changing operating modes. For example, the system may be specified to prevent changing operating modes every few minutes or even every hour. Alternatively, there may be a maximum number of changes allowed per day, week or month.

If, however, the motor/generator 502 (FIG. 5) is not on, as determined in decision block 986, the motor/generator 502 (FIG. 5) is started in block 994. If the motor/generator 502 (FIG. 5) is up to the proper speed, as determined in decision block 996, the M/G-COMP coupling 506 (FIG. 5) is engaged in block 998 and the speed of the engine or turbine 508 (FIG. 5) and motor/generator 502 (FIG. 5) are adjusted to share the load of the compressor 504 in block 988. Note that depending on the type of coupling used, the coupling may always be engaged and it is an overrunning clutch that is actually engaged or disengaged. The system suspends further processing until a transition delay period has expired in block 990 and the process returns in block 992. If, however, the motor/generator 502 (FIG. 5) is not up to the proper speed to engage the M/G-COMP coupling 506 (FIG. 5), as determined in decision block 996, and the start process has not timed out, as determined in decision block 600, the process will wait in block 602 for a period of time before the motor/generator 502 (FIG. 5) speed is checked again in decision block 996. If, however, the start process has timed out, as determined in decision block 600, an error process will be initiated in block 604. The error process 604 may include various system checks, diagnostics and reporting functions. The error process 604 may also shut the motor/generator 502 (FIG. 5) down and disable the M/G start process 828, generation start process 832 and load sharing start process 836 until a technician services the control system and the motor/generator 502 (FIG. 5).

If, however, the engine or turbine 508 (FIG. 5) is on, as determined in decision block 972, and the motor/generator 502 (FIG. 5) is on, as determined in decision block 606, the process returns in block 992 to the main process (FIG. 8) because the system is already in the third operating mode. If, however, the motor/generator 502 (FIG. 5) is not on, as determined in decision block 1006, the motor/generator 502 (FIG. 5) is started in block 974 and the process continues as previously described.

The following data illustrates an example of some of the equipment that can be used to implement the present invention. The applicable data for compressor 654 is:

| Manufacturer: | | ARIEL | Model: JGT-4 |
|---|---|---|---|
| Configuration: | | No. of Throws: | FOUR |
| | | No. of Stages: | ONE |
| Speed Range Min/Max. RPM: 750/1500 | | | Design Speed: 1400/1180 |
| Piston Speed—FPM: 1050/885 | | | |
| Elevat'n Ft: 1000 | Barmtr Psia: 14.165 | | Amb'nt Degf: 100 |

| Compressor Data: | | Driver Data: | |
|---|---|---|---|
| Frame Model: | Stroke Inch: | Rod Dia Inch: | Type: |
| Jgt/4 | 4.500 | 2.000 | Gas Engine |
| Max R1 #Tot: | Max R1 #Tens: | Max R1 #Comp: | Mfr: |
| 74000 | 37000 | 40000 | Caterpillar |
| Rated Rpm: | Rated Bhp: | Rated Ps Fpm: | Model: |
| 1500 | 2600 | 1125 | 3516tale |
| Calc Rpm: | Calc Bhp: | Calc Ps Fpm: | Bhp: |
| 1400 | 1150 | 1050 | 1265 (Cont) |
| Services | | Gathering | |

| Stage Data: | Stage 1 |
|---|---|
| Flow Req'd Mmscfd | 15.000 |
| Flow Calc Mmscfd | 13.991 |
| Cyl Hp Per Stage | 1131.2 |
| Specific Gravity | 0.6500 |
| Ratio Of Sp Ht 'N' | 1.2620 |
| Comprsblty Suc Zs | 0.9558 |
| Comprsblty Dch Zd | 0.9539 |
| Pres Suc Line Psig | 250.00 |
| Pres Suc Flg Psig | 247.50 |
| Pres Dch Flg Psig | 959.50 |
| Pres Dch Line Psig | 950.0 |
| Pres Ratio F/F | 3.7210 |
| TEMP SUC Degf | 80.0 |
| TEMP CLF DCH Degf | 120.0 |

| Cylinder Data: | Throw 1 | Throw 2 | Throw 3 | Throw 4 |
|---|---|---|---|---|
| Cylinder Model | 7-1/4t | 7-1/4t | 7-1/4t | 7-1/4t |
| Cylinder Bore Inch | 7.250 | 7.250 | 7.250 | 7.250 |
| Cyl Rdp (Api) Psig | 1727.0 | 1727.0 | 1727.0 | 1727.0 |
| Cylinder Mawp Psig | 1900.0 | 1900.0 | 1900.0 | 1900.0 |
| Cylinder Action | Dbl | Dbl | Dbl | Dbl |
| Cylinder Disp Cfm | 289.564 | 289,564 | 289.564 | 289.564 |
| Pres Suc Intl Psig | 226.98 | 226.98 | 226.98 | 226.98 |

-continued

| | | | | |
|---|---|---|---|---|
| TEMP SUC INTL Degf | 86.97 | 86.97 | 86.97 | 86.97 |
| Cmprsb'y Suc Zsph | 0.9576 | 0.9576 | 0.9576 | 0.9576 |
| Pres Dch Intl Psig | 1035.46 | 1035.46 | 1035.46 | 1035.46 |
| TEMP DCH INTL Degf | 281.98 | 281.98 | 281.98 | 281.98 |
| He Suc Gas Vel Fpm | 9267 | 9267 | 9267 | 9267 |
| He Dch Gas Vel Fpm | 8957 | 8957 | 8957 | 8957 |
| He Spacrs Used/Max | 0/4 | 0/4 | 0/4 | 0/4 |
| He Vvpkt % Cl Avail | 0.9 + 52.4 | 0.9 + 52.4 | 0.9 + 52.4 | 0.9 + 52.4 |
| % Of Vvpkt Used | 19.19 | 19.19 | 19.19 | 19.19 |
| He Min Clearance % | 17.76 | 17.76 | 17.76 | 17.76 |
| He Tot Clearance % | 28.68 | 28.68 | 28.68 | 28.68 |
| He Vol Eff % | 40.57 | 40.57 | 40.57 | 40.57 |
| Ce Suc Gas Vel Fpm | 8562 | 8562 | 8562 | 8562 |
| Ce Dch Gas Vel Fpm | 8276 | 8276 | 8276 | 8276 |
| Ce Spacrs Used/Max | 0/4 | 0/4 | 0/4 | 0/4 |
| Ce Min Clearance % | 20.73 | 20.73 | 20.73 | 20.73 |
| Ce Tot Clearance % | 20.73 | 20.73 | 20.73 | 20.73 |
| Ce Vol Eff % | 54.94 | 54.94 | 54.94 | 54.94 |
| Suc Pseu-Q He/Ce % | 9.6/8.5 | 9.6/8.5 | 9.6/8.5 | 9.6/8.5 |
| Gas Rod Ld Out # | 34267 C | 34267 C | 34267 C | 34267 C |
| Gas Rod Ld In # | 29968 T | 29968 T | 29968 T | 29968 T |
| Gas Rod Ld Tot # | 64235 | 64235 | 64235 | 64235 |
| Gas Rod Ld Revrsl | Yes | Yes | Yes | Yes |
| Flow Calc Mmscfd | 3.498 | 3.498 | 3.498 | 3.498 |
| Cylinder | 282.8 | 282.8 | 282.8 | 282.8 |

The cylinders have manually adjustable VV pockets. Plate type valves are used. The compressor 504 also includes utility piping with a valve to drain crankcase oil to the edge of the skid 512. Packing vents and drains are also piped to edge of the skid 512. Frame oil piping is installed as required.

The applicable data for the engine 508 is:

| | |
|---|---|
| Manufacturer: | CATERPILLAR |
| Model: | 3516TALE |
| Configuration/No. of Cylinders: | V-16 |
| Combustion Type: | Turbo-Charged |
| Compression Ratio: | 8:1 |
| Bore × Stroke: | 6.7 × 7.5 |
| Displacement (cu. inches): | 4210 |
| Speed Range Min/Max: | 900–1400 |
| Continuous BHP @ Mfg. Rating: | 1265 @ 1400 RPM |
| | 1180 @ 1300 RPM |
| | 1085 @ 1200 RPM |
| | 995 @ 1100 RPM |
| Ignition System: | Caterpillar Electronic Ignition System (E.I.S.). |
| Exhaust System: | Residential Grade Muffler Mounted on Top of the Cooler with a Stainless Steel Expansion Joint. |
| Fuel Gas System: | Coalescing Fuel Gas Filter, Block Valve, Fuel Shutoff and Vent Valve, Relief Valve, Pressure Regulators. |
| Starting System: | Ingersoll Rand Starter with Strainer, Pre-Lube, Push Button for Remote Start, Exhaust Piped to Top of Cooler. |
| Emissions: | Nox 2.0 grams, CO 1.9 grams, NMHC 0.44 grams |
| Also Includes: | Turbocharger oil accumulator to lubricate and coal turbo system after shutdown. |

The applicable data for the motor/generator 502 is:

| | |
|---|---|
| BRAND: | Teco-Westinghouse |
| BHP: | 1250 |
| RPM: | 1200 |
| PHASE/HZ/VOLTS: | 3/60/4160 |
| INSULATION/S.F.: | F-VPI/1.15 |
| ENCLOSURE: | Class 1, Group D, Div 2 |
| STARTER: | J-C Across the Line Starter |
| INCLUDES: | Class F Insulation, 1.15 S.F. with Class B rise at 1.0 S.F., 60 HZ, Non Sparking for Div. 2 area, 120 Volt Space Heaters, 3300 ft elevation, 40 deg. C. ambient, Standard Engineering Test. Space heaters will be terminated in the motor starter or MCC. Stator and bearing RTD's are included |

The first and second couplings 506 and 510 can be fixed couplings or couplings that incorporate an overrunning clutch into the driven hub that mounts the motor shaft. In order to use the engine or turbine 508, the engine or turbine 508 is started allowed to warm up at idle speed. The engine or turbine 508 is then sped up to run speed. When the engine or turbine 508 speed becomes faster than the motor/generator 502 speed, the overrunning clutch engages and the engine or turbine 508 becomes the prime mover.

The applicable data for the cooler (not shown) is:

| | |
|---|---|
| Manufacturer: | AIR X CHANGERS |
| Model: | 132EH |
| Fan Diameter: | 132" |
| Fan Tip Speed: | <12,000 FPM |

| Sections | Max Working Pressure | Design Temperature Degrees In/Out | Louvers |
|---|---|---|---|
| FJW | 150 PSIG | 195/168 Degrees | |
| TAW | 150 PSIG | 148/130 Degrees | |
| AC | 1100 PSIG | 282/120 Degrees | Manual |

| | |
|---|---|
| Ambient Design Temperature: | 100° F. |
| Design Approach | 200° F. |

Water surge tank complete with gauge glass, vent and fair cap.

| Service | EJW/SLOW | TAW/CLOW | AC |
|---|---|---|---|
| Flow | 264 GPM | 90 GPM | 14. OMMSCFD |
| Fluid | 50% GLY | .50% GLY | .65 SPGR |
| Temperature in, ° F. | 195.0 | 147.8 | 282.0 |
| Temperature out, ° F. | 168.1 | 130.0 | 120.0 |
| Pressure, PSI | | | 960 PSIG |
| Pressure Drop, PSI | 2.5 | 1.3 | 5.9 |
| Heat Load, BTU/HR | 3333837 | 715079 | 2975148 |
| True MTD | 59.0 | 30.3 | 52.8 |
| Overall Rate | 163.5 | 126.3 | 113.6 |
| Foulling Factor | .0005 | .0005 | .0010 |
| Tube Surface, Sq. Ft. | 346 | 191 | 498 |
| Total Surface, Sq. Ft. | 5498 | 3032 | 7913 |
| Sections, No. of | COMBINED | COMBINED | 1 |
| Connected | SINGLY | SINGLY | SINGLY |
| No. Pieces | 1 | 1 | 2 |
| Design Temp., ° F. | 300/−10 | 300/10 | 350/10 |
| Design Press., PSIG | 150 | 150 | 1100 |
| Totl Press., PSIG | 225 | 225 | 1650 |
| Nozzles | 6-150RF | 3-150RF | 6-600RF |
| Tubes, OD × BWO | ⅝ × 16 | ⅝ × 16 | ⅝ × 16 |
| Material | SA214 STEEL | SA214 STEEL | SA214 STEEL |
| No./Sect., Lgth., Ft. | 107, 20 | 59, 20 | 154, 20 |
| No. Rowes | 3 | 3 | 4 |
| Flanges | SA105SCH 40 | SA105SCH 40 | SA105SCH 80 |
| Fins. Type | WHEEL | WHEEL | WHEEL |
| Material | AL | AL | AL |
| Headers, Type | BOX | BOX | BOX |
| Materials | STEEL | STEEL | STEEL |
| Plugs, Type | TAPER | TAPER | SHOULDER |
| Material | BRASS | BRASS | STEEL |

-continued

| | | | |
|---|---|---|---|
| ASME, Code Stamp | | | YES |
| Total SCFM 177190 | Temp. to ° F. 100 | Temp Out ° F. 136 | Elev. Ft. 1000 |

The applicable data for the cooler driver (not shown) is:

| | |
|---|---|
| Manufacturer: | ARROW SPECIALTY COMPANY |
| Model: | VRG 330 |
| Configuration/No. of Cylinders: | In-line 6 |
| Combustion Type: | Naturally Aspirated |
| Bore x Stroke: | 3.875/4.665 |
| Displacement (cu. inches): | 330 |
| Speed Range Min/Max: | 900/2200 |
| Continuous BHP @ Mfg. Rating: | 68 @ 1800 RPM |
| | 60 @ 1600 RPM |
| | 52 @ 1400 RPM |
| | 42 @ 1200 RPM |
| Ignition System: | Altronic V non Shielded |
| Exhaust System: | Engine Mounted Muffler |
| Fuel Gas System: | Block Valve, Fuel Shutoff and Vent Valve, Relief Valve, Pressure Regulators. |
| Starting System: | Air/Gas Starter with Strainer. |
| Emissions: | Nox 11.6, CO 14.6, NMHC 0.2 |

The applicable data for the scrubbers (not shown) are:

| | |
|---|---|
| Process: | Suction |
| Diameter: | 30 |
| Sts: | 60 |
| Mawp: | 635 |
| Asme Code: | Yes |
| Internal Design: | Mesh |
| Liquid Level Shutdown: | MURPHY L1200 |
| Liquid Level Controller: | MALLARD 3200 |
| Liquid Level Dump Valve: | MALLARD 5127 |
| Reflex Gauge Glass w/Cocks: | Penberthy Or Equal |
| Drain Piping: | 1" NPT |

Relief valves for discharge and the fuel system are Mercer or Equal—Spring Operated. The relief valve exhaust is piped above cooler. Process piping is built in accordance with ANSI B31.3 Code. Suction and Discharge pulsation bottles are ASME Code Stamped. Scrubber and Pulsation Bottle sizes and working pressures apply to typical design conditions.

The applicable data for the programmed logic controller ("PLC") control panel is:

| Qty | Description | Manufacturer | Part Number |
|---|---|---|---|
| 1 | Chasis, 10-slot | Allen Bradley | 1746-A10 |
| 1 | Power Supply Module | Allen Bradley | 1748-P3 |
| 1 | Processor Module, 16k Mem, DH+ | Allen Bradley | 1747-L641 |
| 1 | EPROM, CPU | Allen Bradley | 1747-M11 |
| 1 | Discrete, 24 V Sink, 16 Input Module | Allen Bradley | 1746-1B16 |
| 1 | Cable, Interface, Module, 16-channel Disctete In | Entrelec | 0027 816.17 |
| 1 | Term, Interface, Module 16-channel Disctete In | Entrelec | 0031 025.05 |
| 1 | Discrete, 24 V Sink, Output Module | Allen Bradley | 1746-0816 |
| 1 | Cable, Interface, 16-channel Disctete Out | Entrelec | 0027 622.15 |
| 1 | Term, Interface, 16-channel Discrete Out | Entrelec | 0031 026.06 |
| 1 | Analog, 4–20 mA, 6 in Module | Allen Bradley | 1745-N15 |
| 1 | Cable, Interface, Module, S-channel Analog In | | 0034 702.25 |
| 1 | Term, Inteface, 8-channel Analog In | Entrelec | 0021 062.11 |
| 1 | Analog, 4–20 mA, 4 out Module | Allen Bradley | 1746-NO41 |
| 1 | Cable, Interface, Module 4-channel Analog Out | Entrelec | 0027 804.24 |
| 1 | Term, Interface, 4-channel Analog Out | Entrelec | 0021 060.23 |
| 1 | Universal Analog Module, 8 channel | Spectrum | 1748so-NIBu |
| 1 | CAT CCM Module | Caterpillar | 162-8734 |
| 1 | CCM Cable | Caterpillar | 152-0453 |
| 1 | AB CCM Interface Module | Mlille | Omnii-Comm |
| 3 | Modular Cart Slot Filler | Allen Bradley | 1748-N2 |
| 1 | PB, Rod Mushroom, "E8D" | Allen Bradley | 800H-FRXTBAP |
| 1 | Sw, 2-pos | Allen Bradley | 800H-HR2D1P |
| 1 | PanelView 1000, AMBER, 24 Vdc, Keypad, DH+ | Allen Bradley | 2711K10G8L1 |
| 1 | Power Supply, AC to 24 Vdc, 400 Watts | Viaar | VI-PU33-EUU |
| 6 | Fuse Block, Entrelec | Entrelec | 00005918 |
| 5 | Fuse, 6 amp, 3AG | Littlefuse | 00005619 |
| 1 | Fuse, 15 amp, 3AG | Littlefuse | 00004709 |
| 50 | Terminal Blcok, Entrelec, | Entrelec | 00003871 |
| 4 | End Section, Entrelec, | Entrelec | 00003872 |
| 8 | End Stop, Entrelec, | Entrelec | 00003873 |
| 1 | F11, Acromag | Phoenix | 250T-FQ1-DT1 |
| 6 | Relay, 4PDT, CI Divll | Square D | 00006291 |
| 6 | Relay, Socket | Square D | 00007488 |
| 1 | Enclosure, 50 × 88 w/Back Panel | FW Murphy Mfr | 50225253 |
| 1 | Base, Enclosure | FW Murphy Mfr | 50225276 |
| 1 | Speed Regulator | FW Murphy Mfr | 05704181 |
| 1 | Speed Gauge | FW Murphy Mfr | 00006482 |
| 7 | Speed Know | FW Murphy Mfr | 00005481 |

| | |
|---|---|
| Analog Input/Outputs: | Suction pressure—Rosemount Pressure Transmitter |
| | Discharge pressure—Rosemount Pressure Transmitter |
| | Compressor lube oil filter differential pressure—Rosemount Pressure Transmitter |
| RTD'S: | Motor bearing and stator |
| | Compressor discharge temperature—each cylinder |
| | Compressor lube oil temperature |
| Discrete Inputs: | Compressor oil level low—KENCO LCE—10-FS |
| | Engine oil level low—KENCO LCE—10-FS |
| | High vibration—compressor—Murphy VS 2 |
| | High vibration—motor—Murphy VS 2 |
| | High vibration—cooler—Murphy VS 2 |
| | Lubricator no-flow—Whitlock DNFT-LED-PS |

The skid 512 is a heavy duty oil field type with 3/16" checkered floor plate, four main runners and leveling jack screws. Skid members support all vessels and piping, and are provided with pipe ends for skidding and lifting. The skid 512 will be concrete filled under the engine, compressor frame & distance pcs. The skid 512 also includes an environmental drip rail with four drain sumps. The skid 512 has estimated package dimensions of fourteen feet (14') wide by thirty-five feet (35') long and an estimated weight of 125,000 lbs. The cooler has estimated package dimensions of twenty-one feet (21') wide by fifteen feet (15') long and an estimated weight of 20,000 lbs.

Figure 9:
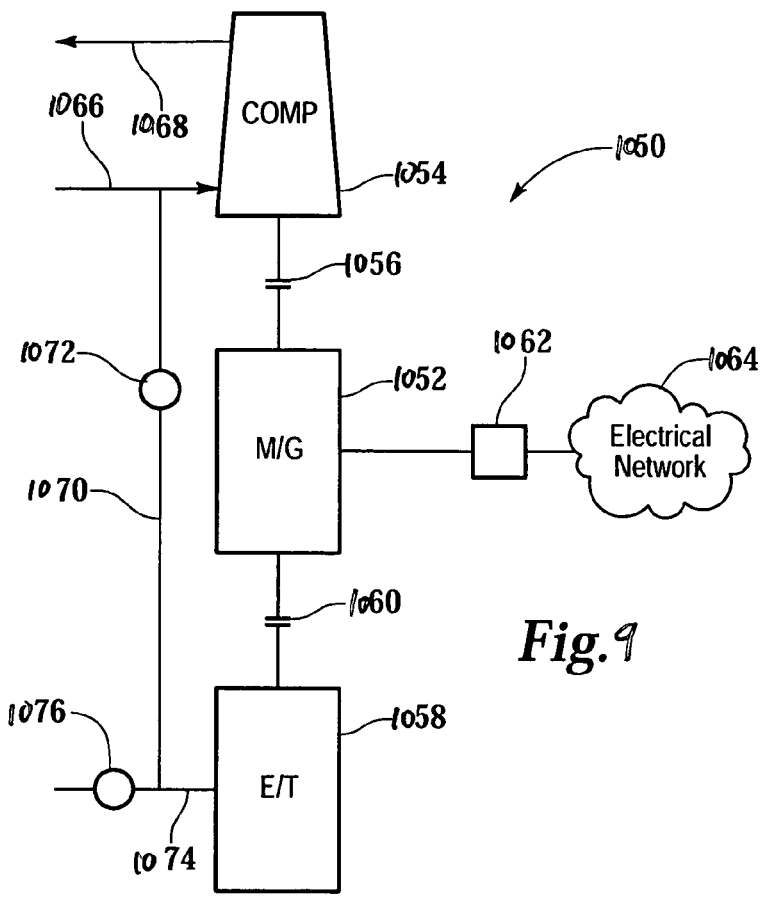
FIG. 9 is a block diagram of a redundant prime mover system in accordance with another embodiment of the present invention.

Now referring to FIG. 9, a block diagram of a redundant prime mover system 1050 in accordance with another embodiment of the present invention is shown. The redundant prime mover system 1050 includes a motor/generator 1052 coupled to a compressor 1054 with a first coupling 1056 (also referred to as the "M/G-COMP Coupling") and a engine or turbine 1058 coupled to the compressor 1054 with a second coupling 1060 (also referred to as the "E/T-COMP Coupling"). Couplings 1056 and 1060 can be a clutch, coupling (e.g., fixed, magnetic, etc.), gearbox or other suitable device to selectively engage/disengage the shaft of the compressor or pump 1054. Note that depending on the type of coupling used, the coupling may always be engaged and it is an overrunning clutch that is actually engaged or disengaged. The motor/generator 1052 and the engine 1058 can be variable speed devices. In one embodiment of the present invention, the engine 1058 is oversized so that some amount of electricity can be generated using the motor/generator 1052 even with the compressor 1054 is operating at peak load. In small to medium applications, the motor/generator 1052, compressor 1054 and engine or turbine 1058 can be mounted on a skid (not shown) to form a package that can be transported and set up more quickly and economically than individually installing components 1052, 1054, 1056, 1058 and 1060 in the field. As will be appreciated by those skilled in the art, other equipment (not shown), such as coolers, cooler drivers, scrubbers and application specific devices, may be connected to the motor/generator 1052, compressor 1054 or engine 1058.

The motor/generator 1052 is electrically connected to an electrical network connection 1062, which is used as a source of electricity to run the motor/generator 1052 and drive the compressor 1054 and a delivery point for the electricity generated by the motor/generator 1052 when the engine 1058 is supplying more output power than is required to drive the compressor 1054. The exact interface between the electrical network connection 1062 and the transmission or distribution system 1064 will vary from one installation to another. The electrical network connection 1062 may include some of the equipment described in FIG. 5, such as step-down/step-up transformer, breaker or switches.

Although a compressor 1054 is depicted, compressor 1054 could also be a pump or other machine that is driven by large engines, turbines or motors. Input line 1066 and output line 1068 are connected to compressor 1054. As will be appreciated by those skilled in the art, the connection of the lines 1066 and 1068 to the compressor 1054 will also include various valves, regulators and other flow protection/regulation devices. These lines 1066 and 1068 may be taps off of a pipeline, such as natural gas or other petroleum product, or part of a processing plant. If input line 1066 contains a product that can be used as fuel for the engine or turbine 1058, a first fuel supply line 1070 having a regulating valve 1072 will connect the input line 1066 to the engine or turbine 1058. In such cases, first fuel supply line 1070 will serve as the primary fuel supply for the engine or turbine 1058. A second fuel supply line 1074 having a regulating valve 1076 will typically connect the engine or turbine 1058 to an alternate fuel supply. If input line 1066 does not contains a product that can be used as fuel for the engine or turbine 1058, second fuel supply line 1074 will be the primary source of fuel to the engine or turbine 1058.

In this embodiment, the two or more available power sources 106 and 108 (FIG. 1) include an engine 1058 and a motor/generator 1052. The device or delivery point 110 (FIG. 1) includes a machine (compressor) 1052 an electrical network connection 1062. The engine 1058 is coupled to the motor/generator 1052. The motor/generator 1052 is coupled to the machine 1054 and the electrical network connection 1062.

Figure 10:
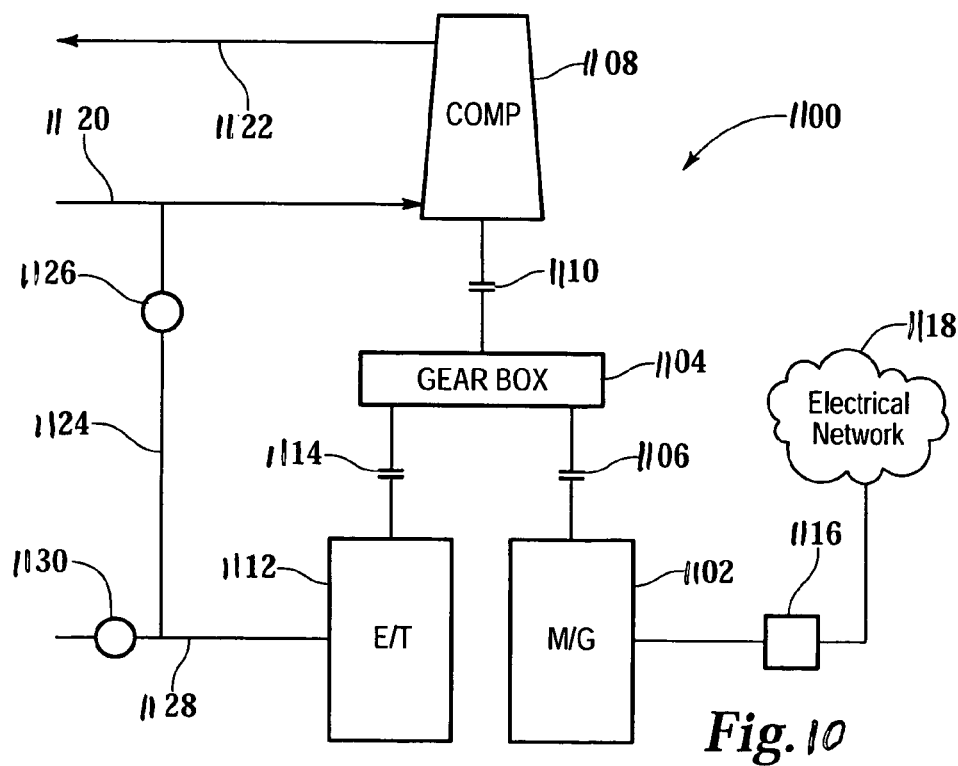
FIG. 10 is a block diagram of a redundant prime mover system in accordance with another embodiment of the present invention.

Referring now to FIG. 10, a block diagram of a redundant prime mover system 1100 in accordance with another embodiment of the present invention is shown. The redundant prime mover system 1100 includes a motor/generator 1102 coupled to a gearbox 1104 with a first coupling 1106 (also referred to as the "M/G-COMP Coupling"), a compressor 1108 coupled to the gearbox 1104 with a third coupling 1110 and a engine or turbine 1112 coupled to the gearbox 1104 with a second coupling 1114 (also referred to as the "E/T-COMP Coupling"). Couplings 1106, 1110 and 1114 can be a clutch, coupling (e.g., fixed, magnetic, etc.), gearbox or other suitable device to selectively engage/disengage the shaft of the motor/generator 1106, compressor or pump 1108 and engine or turbine 1112. The motor/generator 1106 and the engine 1112 can be variable speed devices. In one embodiment of the present invention, the engine 1112 is oversized so that some amount of electricity can be generated using the motor/generator 1102 even with the compressor 1108 is operating at peak load. In small to medium applications, the motor/generator 1102, gearbox 1104, compressor 1108 and engine or turbine 1112 can be mounted on a skid (not shown) to form a package that can be transported and set up more quickly and economically than individually installing components 1102, 1104, 1106, 1108, 1110, 1112 and 1114 in the field. As will be appreciated by those skilled in the art, other equipment (not shown), such as coolers, cooler drivers, scrubbers and application specific devices, may be connected to the motor/generator 1102, gearbox 1104, compressor 1108 and engine or turbine 1112.

The motor/generator 1102 is electrically connected to an electrical network connection 1116, which is used as a source of electricity to run the motor/generator 1102 and drive the compressor 1108 and a delivery point for the electricity generated by the motor/generator 1102 when the engine 1114 is supplying more output power than is required to drive the compressor 1108. The exact interface between the electrical network connection 1116 and the transmission or distribution system 1118 will vary from one installation to another. The electrical network connection 1116 may include some of the equipment described in FIG. 5, such as step-down/step-up transformer, breaker or switches.

Although a compressor 1108 is depicted, compressor 1108 could also be a pump or other machine that is driven by large engines, turbines or motors. Input line 1120 and output line 1122 are connected to compressor 1108. As will be appreciated by those skilled in the art, the connection of the lines 1120 and 1122 to the compressor 1108 will also include various valves, regulators and other flow protection/regulation devices. These lines 1120 and 1122 may be taps off of a pipeline, such as natural gas or other petroleum product, or part of a processing plant. If input line 1120 contains a product that can be used as fuel for the engine or turbine 1112, a first fuel supply line 1124 having a regulating valve 1126 will connect the input line 1120 to the engine or turbine 1112. In such cases, first fuel supply line 1124 will serve as the primary fuel supply for the engine or turbine 1112. A second fuel supply line 1128 having a regulating valve 1130 will typically connect the engine or turbine 1112 to an alternate fuel supply. If input line 1120 does not contains a product that can be used as fuel for the engine or turbine 1112, second fuel supply line 1128 will be the primary source of fuel to the engine or turbine 1112.

Now turning to the second example, an electricity transfer station is described below in relation to FIGS. 11-19. Electricity suppliers have traditionally sold electricity to large customers, such as large commercial and industrial customers, rural electric cooperatives and municipalities, based on a demand charge and the customer's actual electricity usage. The demand charge is based on the customer's expected or actual peak demand (normally measured in kilowatts ("KW")) over a short period of time (normally 15 to 30 minutes) during a contractual billing period. The customer's peak demand and electricity usage (normally measured in kilowatt-hours ("KWH")) charges are typically specified in long term contracts. As a result, the customer pays a periodic fee, usually monthly, for the ability to draw its peak demand from the electricity supplier via a transmission network even though that peak demand may only occur once during the contractual billing period, if at all. Moreover, if the customer's actual demand exceeds the contractual demand, significant excess demand charges and/or penalties may be imposed on the customer.

Some customers, such as rural electric cooperatives and municipalities, have negotiated long term, low cost electricity purchase contracts with their electricity suppliers. As the re-delivery market for electricity has developed over the years through deregulation and diversification, some of these customers and third-party electricity suppliers have seen an opportunity to purchase additional electricity under existing electricity purchase contracts and re-deliver that additional electricity to other customers at a profit. The sale of such additional electricity is, however, limited and reduced in value if it cannot be sold on a firm basis. For example, the customer may limit the amount of electricity that can be re-delivered based on the economics of the electricity purchase contract. Furthermore, the additional electricity may be reduced in value because it is sold under an interruptible contract, which means that the availability of the additional electricity is not guaranteed during peak demand periods. In order to provide non-interruptible electricity, the customer or third-party electricity supplier would risk setting a new peak demand for the customer, which may be financially unacceptable.

The electricity transfer station allows electricity to be secured by a customer of an electricity supplier via a transmission network under an existing electricity supply contract and re-delivered by that customer to another party under a non-interruptible supply contract without risk of increasing the customer's peak demand above a desired value. This system affords the customer more flexibility, and thus more opportunity to extract value from its supply contracts as well as its distribution, transmission and generation equipment.

Figure 11:
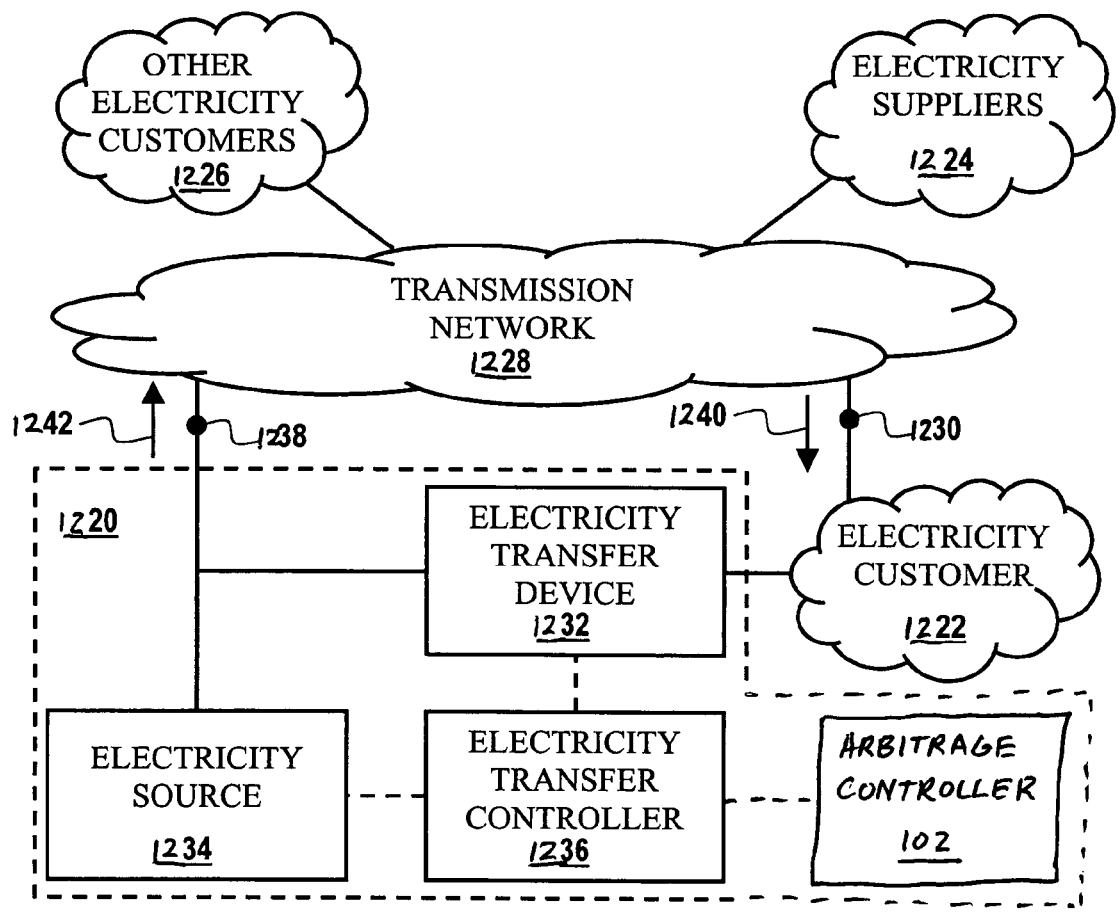
FIG. 11 is a block diagram showing an electricity transfer station connected to an electricity customer, and an electricity supplier and other electricity customers via a transmission network.

Referring now to FIG. 11, a block diagram showing an electricity transfer station 1220 connected to an electricity customer 1222, and to one or more electricity suppliers 1224 and other electricity customers 1226 via a transmission network 1228 is shown. The electricity customer 1222, which may be a large commercial or industrial customer, rural electric cooperative or municipality, purchases electricity from an electricity supplier(s) 1224 via the transmission network 1228 at an electricity delivery point 1230, also referred to as a second network connection. The electricity delivery point 1230 can be at nominal transmission voltages, such as 69 kilovolts ("KV"), 138 KV, 230 KV or 345 KV, or at nominal distribution voltages, such as 15 KV or 25 KV. Although these voltages are commonly used, the present invention can be designed to operate at any desired voltage. Note also that the electricity customer's metering point may not be at the same point as the electricity delivery point 1230. For example, the delivery voltages may be at 138 KV, but the metering point may be at 25 KV because the metering equipment is less complex and expensive. Adjustments are then made to convert the metering data to a 138 KV equivalent.

The electricity delivery point 1230 will typically be located in or near a substation. The ownership of the equipment in the substation will depend on the contractual agreement between the owner of the transmission network 1228, the electricity supplier(s) 1224 and the electricity customer 1222. Typically, the substation will contain circuit breakers, step-down transformers, metering equipment, distribution circuit breakers/reclosers, switches and various protective and metering devices. The electricity transfer station 1220 of the present invention is typically installed within or next to the electricity customer's substation. Accordingly, the capacity of the electricity transfer station 1220 is affected by the ratings of the equipment within the substation and by any restrictions imposed by the electricity customer 1222, including but not limited to a maximum electricity flow at the electricity delivery point 1230.

The electricity transfer station 1220 includes one or more electricity transfer devices 1232, one or more electricity sources 1234, an electricity transfer controller 1236 and an arbitrage controller 102. The arbitrage controller 102 can be physically located with the electricity transfer controller 1236, integrated within the electricity transfer controller 1236, or located at a remote location. The electricity transfer station 1220 is connected to the transmission network 1228 or some other transmission network at the electricity re-delivery point 1238, also referred to as a first network connection. As indicated by arrow 1240, also referred to as a second electricity flow, electricity flows from the transmission network 1228 through electricity delivery point 1230 to the electricity customer 1222 and the electricity transfer station 1220. As indicated by arrow 1242, also referred to as a first electricity flow, electricity flows from the electricity transfer station 1220 through electricity re-delivery point 1238 to the transmission network 1228.

The one or more electricity transfer devices 1232 may be a phase-shifting transformer, a static transfer device (AC to direct current ("DC") to AC conversion system), a motor-generator package (AC to DC converter, DC motor and AC generator) or other suitable devices that can regulate the electricity flow through the electricity transfer device 1232. The one or more electricity sources 1234 may be combustion turbine generators, steam turbine generators, batteries, fuel cells, solar cells, wind generators, biomass generators, hydroelectric generators or other type of electricity source. The one or more electricity sources 1234 generate reliable electricity during peak demand periods and are economical to purchase, lease, operate and/or maintain.

In this embodiment, the two or more available power sources 106 and 108 (FIG. 1) include a second network connection, one or more electricity sources 1234, and a combination of the second network connection 1230 and the one or more electricity sources 1234. The one or more electricity transfer devices 1232 are connected to the one or more electricity sources 1234. The device or delivery point 110 (FIG. 1) includes one or more third network connections 1244, the one or more third network connections 1244 connected to the second network connection 1230 and the one or more electricity transfer devices 1232. In this case, the processor 308 (FIG. 3A) can determine whether to provide electricity from the one or more electricity sources 1234 to a first network connection 1238 connected to the one or more electricity sources 1234 and the one or more electricity transfer devices 1232.

Figure 12:
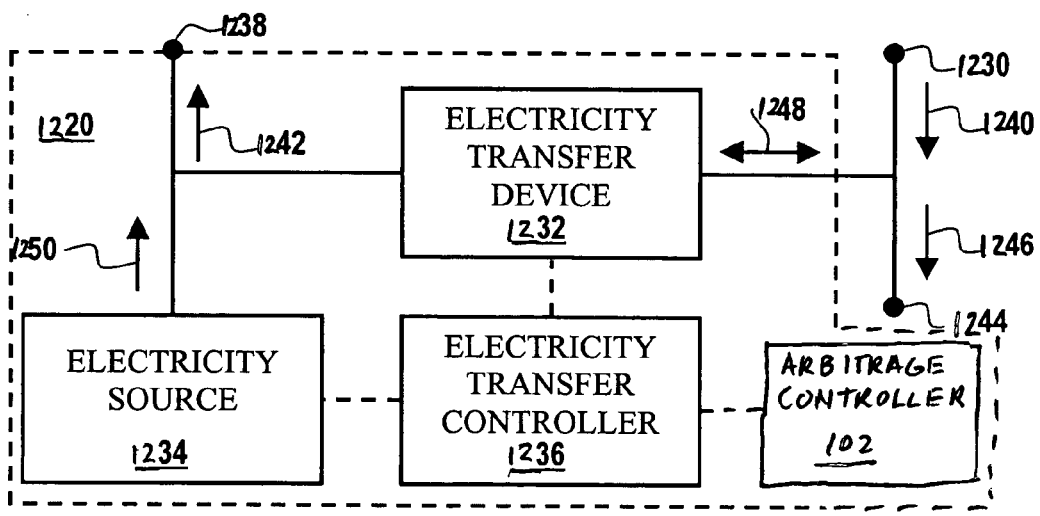
FIG. 12 is a block diagram showing electricity flow in and out of an electricity transfer station in accordance with the present invention.

Now referring to FIG. 12, a block diagram showing electricity flow in and out of an electricity transfer station 1220 in accordance with the present invention is shown. As described in FIG. 11 and indicated by arrow 1240, electricity flows from the electricity delivery point 1230 to primarily serve one or more customer network connections 1244, also referred to as a third network connection. Accordingly, the electricity customer's load is connected to the one or more customer network connections 1244. The electricity flow to the electricity customer 1222 (FIG. 11) is represented by arrow 1246.

When second electricity flow 1240 is less than an a first value, the one or more electricity transfer devices 1232 will cause a electricity to flow into the electricity transfer station 1220, as indicated by arrow 1248 and referred to as a third electricity flow. The first value is a maximum electricity flow determined by the electricity customer 1222 (FIG. 11), which may be based on the contractual and/or physical limitations of the electricity customer's substation. The first value may also be the electrical customer's contractual peak demand or other peak demand limit set by the electricity transfer station 1220. The amount of electricity transfer 1248 is controlled by the electricity transfer controller 1236 so that the first electricity flow 1242 back into the transmission network 1228 (FIG. 11) through electricity re-delivery point 1238 is the desired amount without having the second electricity flow 1240 exceed the first value. Whenever electricity transfer 1248 is insufficient to meet the desired amount for first electricity flow 1242, the electricity transfer controller 1236 will activate and control the one or more electricity sources 1234 to supply the deficiency as indicated by arrow 1250. As a result, the one or more electricity sources 1234 are used to provide additional electricity during the customer's peak demand periods when the second electricity flow 1240 and the third electricity flow 1248 (electricity transfer) cannot be increased to supply the desired amount of first electricity flow 1242.

Note that the one or more electricity sources 1234 could be used to provide electricity back through the one or more electricity transfer devices 1232 or a bypass around the one or more electricity transfer devices 1232 to the electricity customer 1222 (FIG. 11). In such a case, the third electricity flow 1248 would be in the opposite direction and flow into the one or more third network connections 1244. Thus, the one or more electricity sources 1234 could supply electricity to the electricity customer 1222 (FIG. 11) during emergency or peak conditions.

Figure 13:
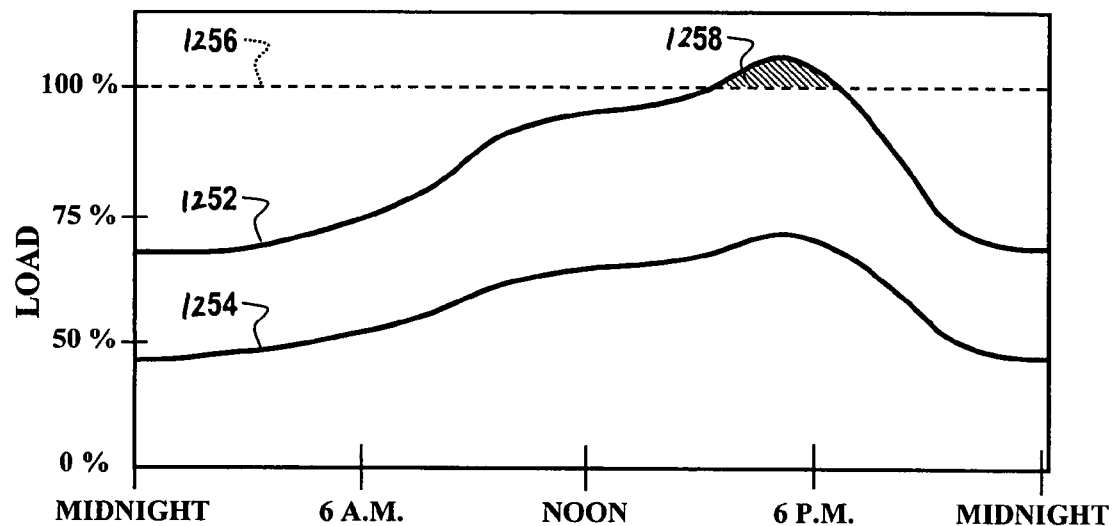
FIG. 13 is a graph showing peak and off-peak demand curves for an electricity customer.

FIG. 13 is a graph showing peak and off-peak demand curves 1252 and 1254, respectively, for electricity customer 1222 (FIG. 11). The peak demand curve 1252 and off-peak demand curve 1254 correspond to different electricity flows (daily and/or seasonal) to the electricity customer 1222 (FIG. 11) represented by arrow 1246 (FIG. 12). Much of the time, the customer's off-peak demand curve 1254 is well below the contractual peak demand 1256. As a result, the difference between lines 1254 and 1256 represents the available electricity that can be re-delivered without setting a new peak demand for the electricity customer 1222 (FIG. 11). As previously mentioned, setting a new peak demand or exceeding the contractual peak demand 1256 may be financially undesirable. For example, the electricity customer 1222 (FIG. 11) may have to pay significant excess demand charges and fees if the peak demand curve 1252 exceeds the contractual peak demand 1256 as indicated by shaded area 1258. In such a case, the contractual peak demand 1256 is equivalent to the first value described above. But, the contractual peak demand 1256 may be any maximum electricity flow determined by the electricity customer 1222 (FIG. 11) or other peak demand limit set by the electricity transfer station 1220.

As shown during peak demand periods, there is less available electricity that can be re-delivered, the difference between lines 1252 and 1256, without setting a new peak demand for the electricity customer 1222 (FIG. 11). As a result, any re-delivered electricity must be sold as interruptible electricity, meaning that delivery of the re-delivery electricity cannot be guaranteed and that the electricity will probably not be available during peak demand periods in which it is most often needed. Interruptible electricity is typically sold at a discount as compared to non-interruptible or firm electricity.

Figure 14:
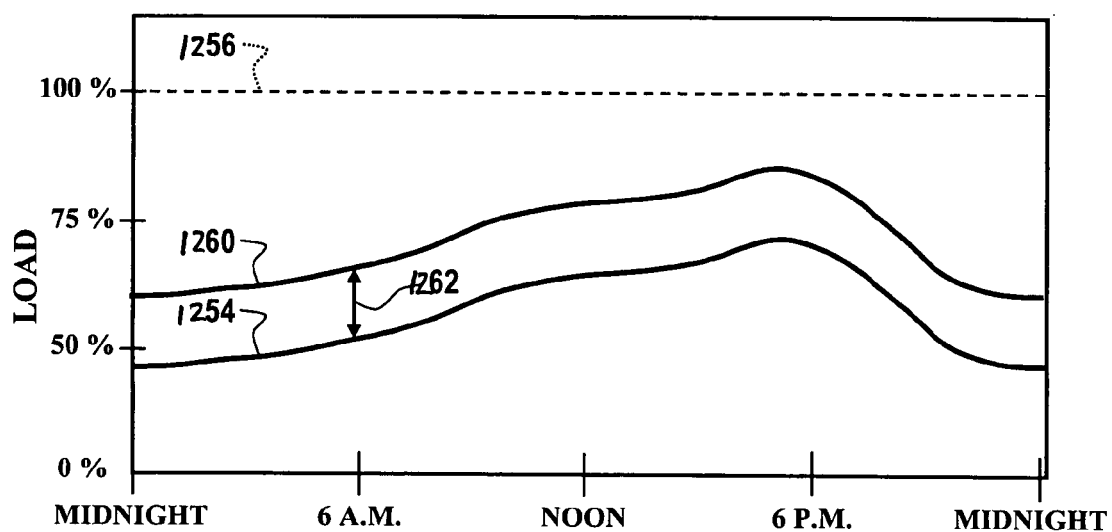
FIG. 14 is a graph showing a customer off-peak demand curve and a total demand curve in accordance with the present invention.

Referring now to FIG. 14, a graph showing a customer off-peak demand curve 1254 and a total demand curve 1260 using the electricity transfer station 1220 (FIGS. 11 and 12) in accordance with the present invention is shown. As mentioned in reference to FIG. 13, the electricity transfer station 1220 (FIGS. 11 and 12) can transfer and re-deliver electricity, without having to generate any additional electricity, as long as the total demand curve 1260 is less than the first value or contractual peak demand 1256. Note that the off-peak demand curve 1254 corresponds to arrow 1246 (FIG. 12) and the total demand curve 1260 corresponds to the second electricity flow 1240 (FIGS. 11 and 12). The re-delivery demand 1262, which is the difference between the total demand curve 1260 and the off-peak demand curve 1254, therefore, represents the first electricity flow 1242 (FIGS. 11 and 12). So, as long as the re-delivery demand 1262 or second value is not set too high, the electricity transfer station 1220 (FIGS. 11 and 12) can operate much of the time without having to generate any additional electricity.

Figure 15:
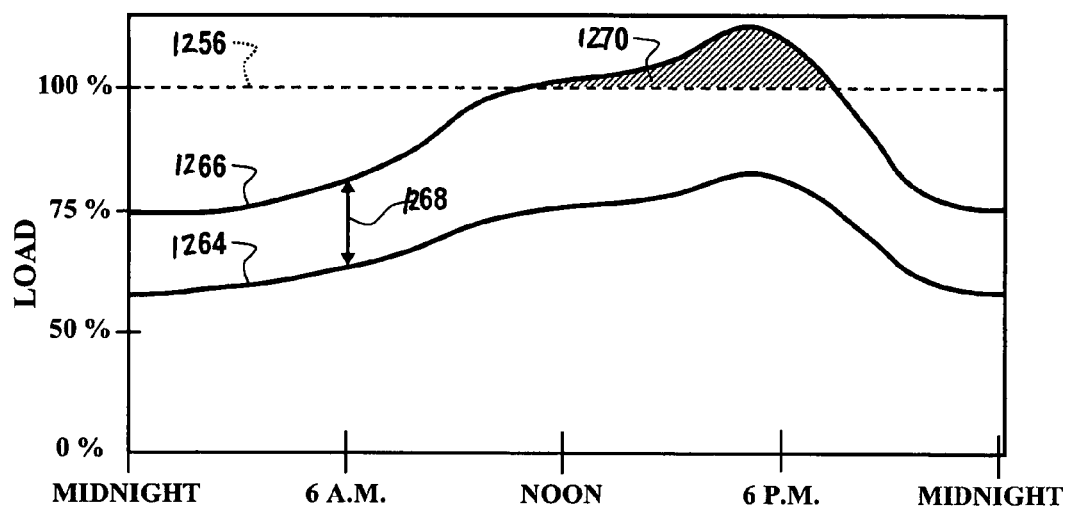
FIG. 15 is a graph showing a customer peak demand curve and a total demand curve without using the electricity transfer station in accordance with the present invention.

Now referring to FIG. 15, a graph showing a customer peak demand curve 1264 and a total demand curve 1266 without using the electricity transfer station 1220 (FIGS. 11 and 12) in accordance with the present invention is shown. Note that the peak demand curve 1264 corresponds to arrow 1246 (FIG. 12) and the total demand curve 1266 corresponds to the second electricity flow 1240 (FIGS. 11 and 12). The re-delivery demand 1268, which is the difference between the total demand curve 1266 and the peak demand curve 1264, therefore, represents the first electricity flow 1242 (FIGS. 11 and 12). If the electricity transfer station 1220 (FIGS. 11 and 12) of the present invention is not used, the total demand curve 1266 or second electricity flow 1240 (FIGS. 11 and 12) will exceed the second value or the electricity customer's contractual peak demand 56 during peak demand periods, as indicated by shaded area 1270. Since the advantages of the electricity re-delivery would most likely be affected if the second value or target peak demand 1256, which may or may not be the contractual peak demand, is exceeded, the first electricity flow 1242 (FIGS. 11 and 12) must be provided as interruptible electricity. If, however, the electricity transfer station 1220 (FIGS. 11 and 12) of the present invention is used, the first electricity flow 1242 (FIGS. 11 and 12) can be provided as non-interruptible electricity.

Figure 16:
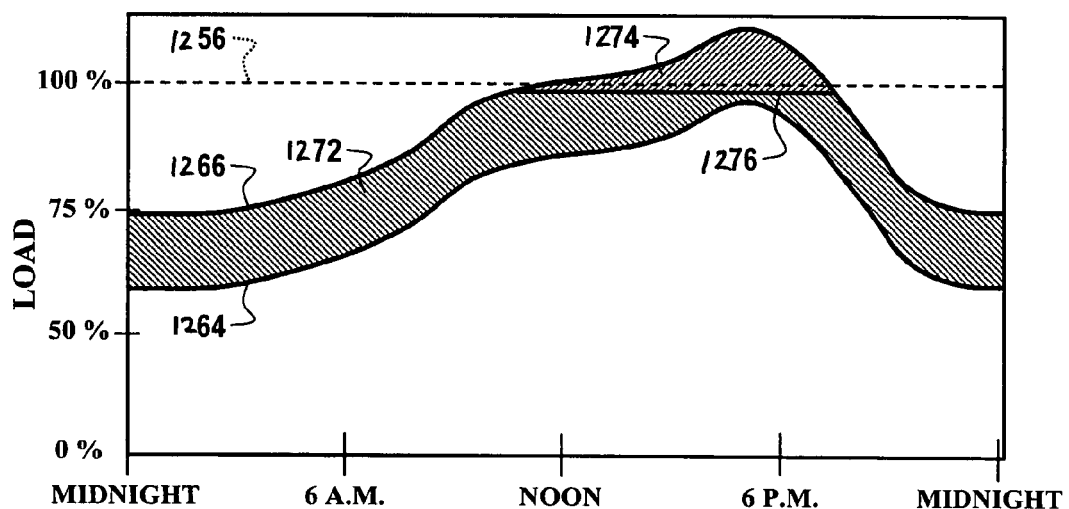
FIG. 16 is a graph showing a customer peak demand curve and a total demand curve using one or more electricity transfer devices and one or more electricity sources in accordance with the present invention.

For example, FIG. 16 is a graph showing a customer peak demand curve 1264 and total demand curve 1266 using one or more electricity transfer devices 1232 (FIGS. 11 and 12) and one or more electricity sources 1234 (FIGS. 11 and 12) in accordance with the present invention. As before, the peak demand curve 1264 corresponds to arrow 1246 (FIG. 12) and the total demand curve 1266 corresponds to the second electricity flow 1240 (FIGS. 11 and 12). The electricity supplied by the one or more electricity transfer devices 1232 (FIGS. 11 and 12) is indicated by shaded area 1272, which corresponds to electricity transfer 1248 (FIG. 12). The electricity supplied by the one or more electricity sources 1234 (FIGS. 11 and 12) is indicated by shaded area 1274, which corresponds to arrow 1250 (FIG. 12). Thus, the combination of shaded areas 1272 and 1274 corresponds to the first electricity flow 1242, which can be provided as non-interruptible electricity. Preferably, an appropriate safety factor, indicated by the difference between lines 1256 and 1276, will be incorporated into the control of the one or more electricity transfer devices 1232 (FIGS. 11 and 12) and the one or more electricity sources 1234 (FIGS. 11 and 12) so that the contractual peak demand 1256 or first value is not exceeded.

Figure 17:
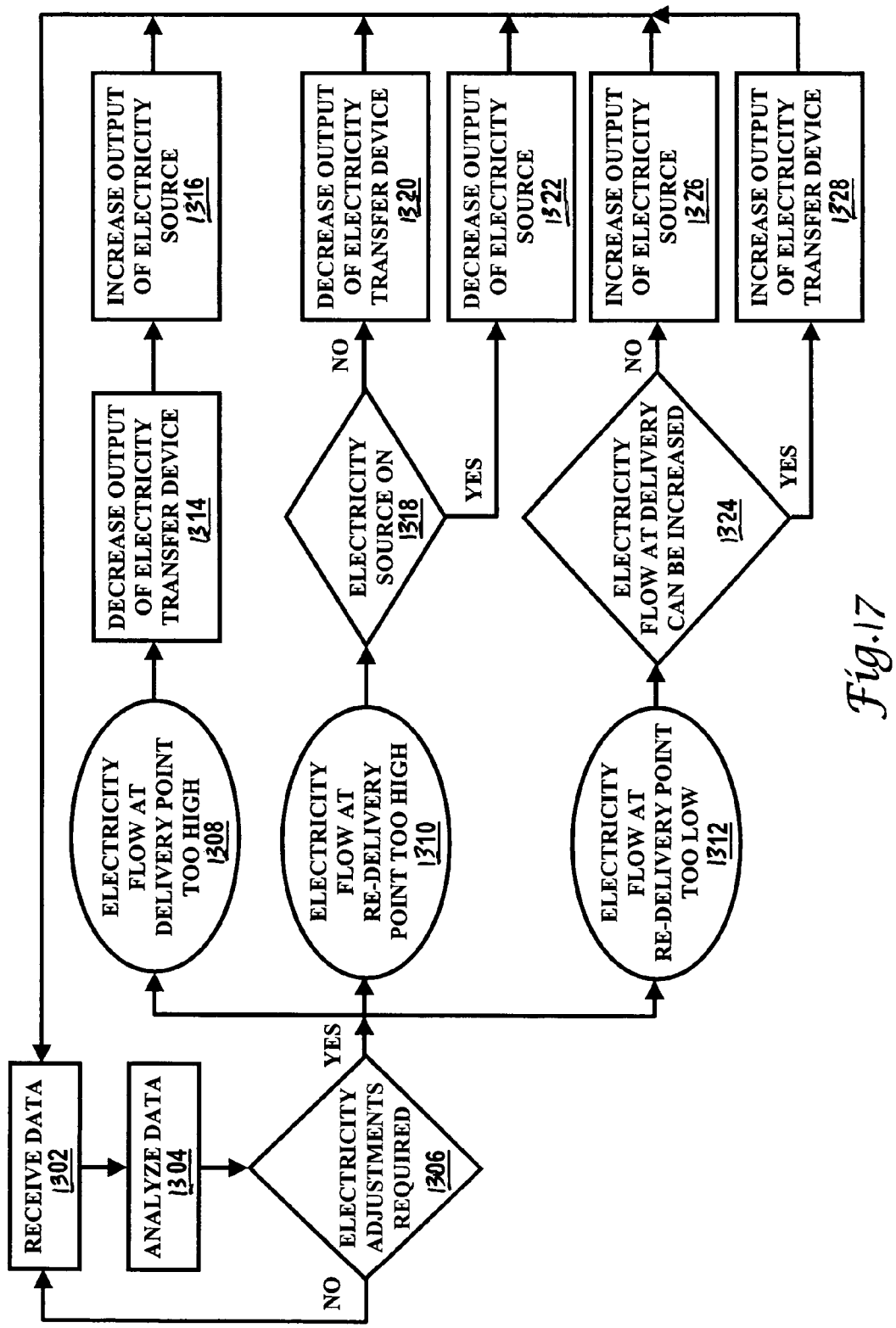
FIG. 17 is a flow chart for the electricity transfer controller in accordance with the present invention.

Referring now to FIG. 17, a flow chart for the electricity transfer controller 1236 (FIGS. 11 and 12) in accordance with the present invention is shown. The electricity transfer controller 1236 (FIGS. 11 and 12) receives operating data from the electricity delivery point 1230 (FIGS. 11 and 12) and the electricity re-delivery point 1238 (FIGS. 11 and 12). As recognized by a person skilled in the art, the electricity transfer controller 1236 (FIGS. 11 and 12) will also receive data from other sources to monitor operating conditions, protective relaying, metering, check for fault or overload conditions, etc. Thereafter, the electricity transfer controller 1236 (FIGS. 11 and 12) will analyze the operating data in block 1304 and determine whether any electricity adjustments to the system need to be made in decision block 1306. If no adjustments are necessary, the process loops back to block 1302 where new operating data is received. Note that the electricity transfer controller 1236 (FIGS. 11 and 12) can be programmed to provide a predefined, variable electricity flow at the electricity re-delivery point 1238 (FIGS. 11 and 12).

If, however, electricity adjustments are required, as determined in decision block 1306, the electricity transfer controller 1236 (FIGS. 11 and 12) will make the appropriate adjustments as illustrated in ovals 1308, 1310 or 1312. If the second electricity flow 1240 (FIGS. 11 and 12) at the electricity delivery point 1230 (FIGS. 11 and 12) is too high, as indicated by oval 1308, the electricity transfer controller 1236 (FIGS. 11 and 12) will decrease the electricity output of the one or more electricity transfer devices 1232 (FIGS. 11 and 12) in block 1314 and will increase the electricity output of the one or more electricity sources 1234 (FIGS. 11 and 12) in block 1316. Thereafter, the process loops back to block 1302 where new operating data is received.

If the first electricity flow 1242 (FIGS. 11 and 12) at the electricity re-delivery point 1238 (FIGS. 11 and 12) is too high, as indicated by oval 1310, the electricity transfer controller 1236 (FIGS. 11 and 12) will determine whether the one or more electricity sources 1234 (FIGS. 11 and 12) are on in decision block 1318. If one or more electricity sources 1234 (FIGS. 11 and 12) are not on, the electricity transfer controller 1236 (FIGS. 11 and 12) will decrease the electricity output of the one or more electricity transfer devices 1232 (FIGS. 11 and 12) in block 1320. If, however, the one or more electricity sources 1234 (FIGS. 11 and 12) are on, as determined in decision block 1318, the electricity transfer controller 1236 (FIGS. 11 and 12) will decrease the electricity output of the one or more electricity sources 1234 (FIGS. 11 and 12) in block 1322. Thereafter, the process loops back to block 1302 where new operating data is received.

If the first electricity flow 1242 (FIGS. 11 and 12) at the electricity re-delivery point 1238 (FIGS. 11 and 12) is too low, as indicated by oval 1312, the electricity transfer controller 1236 (FIGS. 11 and 12) will determine whether the second electricity flow 1240 (FIGS. 11 and 12) at the electricity delivery point 1230 (FIGS. 11 and 12) can be increased in decision block 1324. If the second electricity flow 1240 (FIGS. 11 and 12) at the electricity delivery point 1230 (FIGS. 11 and 12) cannot be increased, the electricity transfer controller 1236 (FIGS. 11 and 12) will increase the electricity output of the one or more electricity sources 1234 (FIGS. 11 and 12) in block 1326. If, however, the second electricity flow 1240 (FIGS. 11 and 12) at the electricity delivery point 1230 (FIGS. 11 and 12) can be increased, as determined in decision block 1324, the electricity transfer controller 1236 (FIGS. 11 and 12) will increase the electricity output of the one or more electricity transfer devices 1232 (FIGS. 11 and 12) in block 1328. Thereafter, the process loops back to block 1302 where new operating data is received.

Figure 18:
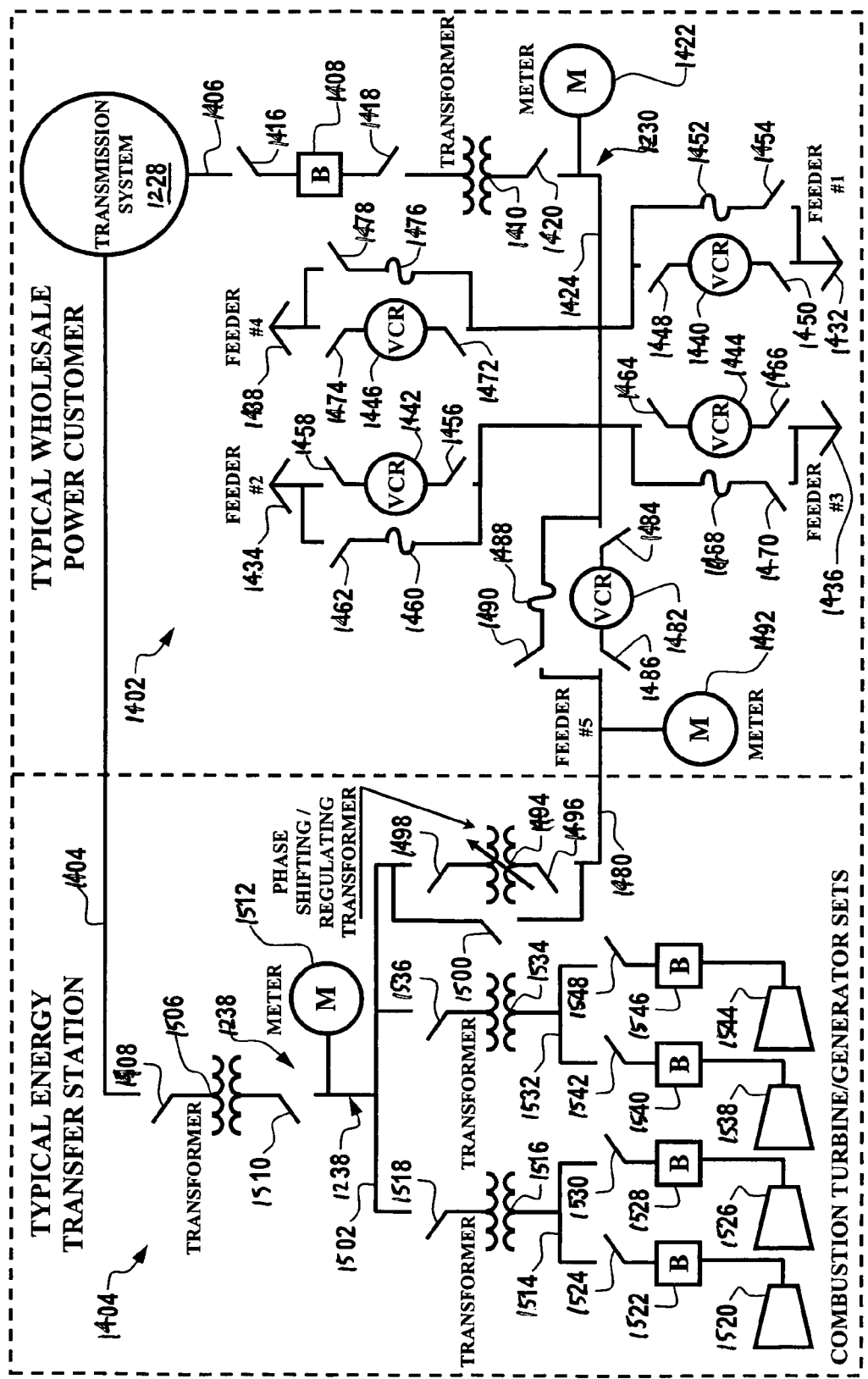
FIG. 18 is a one-line diagram of one possible implementation of the electricity transfer station in accordance with the present invention.

Now referring to FIG. 18, a one-line diagram of one possible implementation of the present invention is shown. A wholesale power customer substation 1402 is connected to a transmission system 1238 via transmission line 1406. A step-down transformer 1410 is connected to the transmission line 1406 via breaker 1408. The breaker 1408 can be isolated with switches 1416 and 1418; whereas the step-down transformer 1410 can be isolated with switches 1418 and 1420. A meter 1422 at the electricity delivery point 1230 or the second network connection records the second energy flow from the step-down transformer 1410. Meter 1422 is connected between the step-down transformer 1410 and the substation distribution bus 1424.

Four distribution feeders 1432, 1434, 1436 and 1438 are connected to the substation distribution bus 1424 via circuit reclosers 1440, 1442, 1444 and 1446 respectively. Thus electricity is distributed to the wholesale customer's system via distribution feeders 1432, 1434, 1436 and 1438. Distribution feeders 1432, 1434, 1436 and 1438 represents the one or more third network connections 1244 (FIG. 12). Circuit recloser 1440 can be isolated with switches 1448 and 1450, and bypassed with fuse 1452 and switch 1454. Circuit recloser 1442 can be isolated with switches 1456 and 1458, and bypassed with fuse 1460 and switch 1462. Circuit recloser 1444 can be isolated with switches 1464 and 1466, and bypassed with fuse 1468 and switch 1470. Circuit recloser 1446 can be isolated with switches 1472 and 1474, and bypassed with fuse 1476 and switch 1478.

The electricity transfer station 1404 is connected to the wholesale power customer's substation 1402 via a distribution bus or line 1480. More specifically, the distribution bus or line 1480 is connected to the substation distribution bus 1424 via circuit recloser 1482. Circuit recloser 1482 can be isolated with switches 1484 and 1486, and bypassed with fuse 1488 and switch 1490. The electricity flow through the distribution bus or line 1480 is measured by meter 1492. A phase shifting/regulating transformer 1494 is connected between the distribution bus or line 1480 and transfer bus 1502. Phase shifting/regulating transformer 1494 or some other electricity transfer devices, causes electricity to flow through distribution bus or line 1480. Phase shifting/regulating transformer 1494 can be isolated with switches 1496 and 1498 or bypassed with switch 1500.

The electricity transfer station 1404 is also connected to the transmission system 148 via transmission line 1504. Step-up transformer 1506 is connected between transmission line 1504 and transfer bus 1502. Step-up transformer 1506 can be isolated with switches 1508 and 1510. A meter 1512 is connected between the step-up transformer 1506 and the transfer bus 1502, which corresponds to the electricity re-delivery point 1238 or first network connection.

A first generation bus 1514 is connected to transfer bus 1502 via step-up transformer 1516 and a switch 1518. A first generator 1520 is connected to the first generation bus 1514 via breaker 1522 and switch 1524. A second generator 1526 is connected to the first generation bus 1514 via breaker 1528 and switch 1530. Similarly, a second generation bus 1532 is connected to transfer bus 1502 via step-up transformer 1534 and a switch 1536. A third generator 1538 is connected to the second generation bus 1532 via breaker 1540 and switch 1542. A fourth generator 1544 is connected to the second generation bus 1532 via breaker 1546 and switch 1548.

Figure 19:
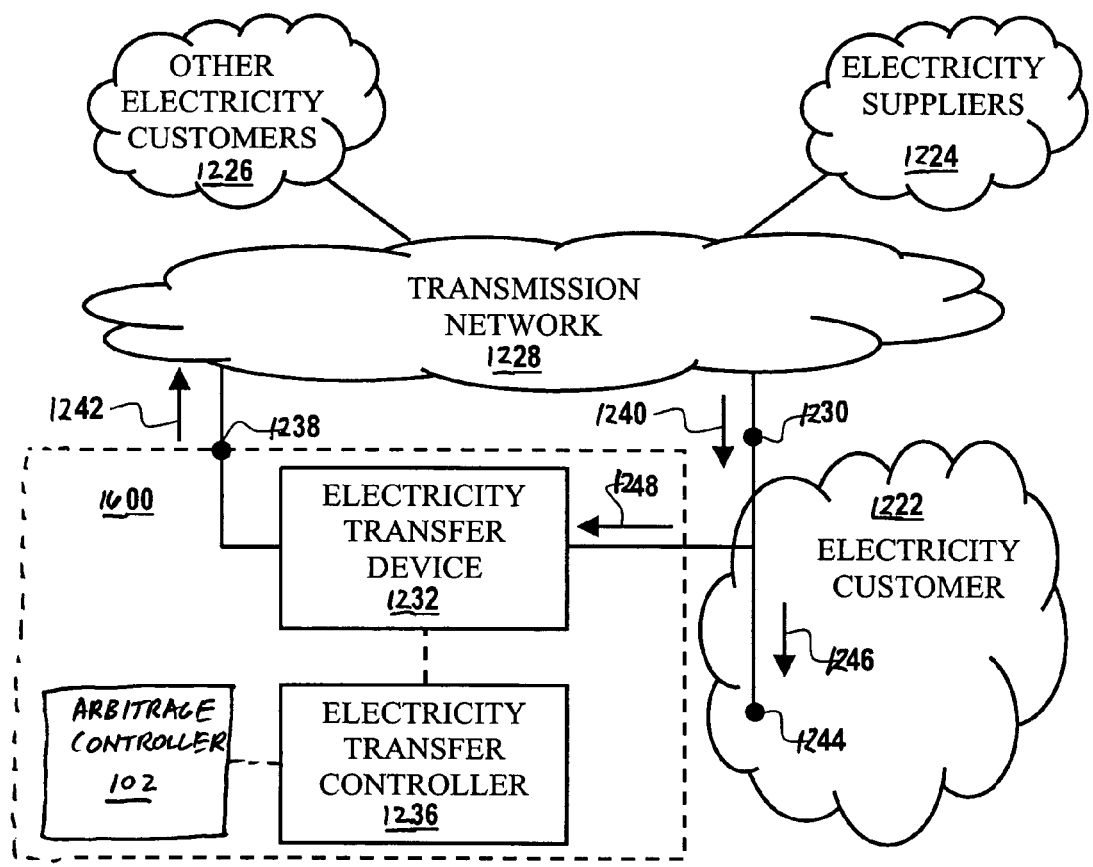
FIG. 19 is a block diagram showing electricity flow in and out of an electricity transfer station in accordance with another embodiment of the present invention.

Now referring to FIG. 19, a block diagram showing electricity flow in and out of an electricity transfer station 1600 in accordance with another embodiment of the present invention is shown. As in FIG. 11, the electricity transfer station 1600 is connected to an electricity customer 1222, and to one or more electricity suppliers 1224 and other electricity customers 1226 via a transmission network 1228. The electricity customer 1222, which may be a large commercial or industrial customer, rural electric cooperative or municipality, purchases electricity from an electricity supplier(s) 1224 via the transmission network 1228 at an electricity delivery point 1230, also referred to as a second network connection. The electricity delivery point 1230 can be at nominal transmission voltages, such as 69 kilovolts ("KV"), 138 KV, 230 KV or 345 KV, or at a distribution voltage, such as 15 KV or 25 KV. Although these voltages are commonly used, the present invention can be designed to operate at any desired voltage. Note also that the electricity customer's metering point may not be at the same point as the electricity delivery point 1230. For example, the delivery voltage may be at 138 KV, but the metering point may be at 25 KV because the metering equipment is less complex and expensive. Adjustments are then made to convert the metering data to a 138 KV equivalent.

The electricity delivery point 1230 will typically be located in or near a substation. The ownership of the equipment in the substation will depend on the contractual agreement between the owner of the transmission network 1228, the electricity supplier(s) 1224 and the electricity customer 1222. Typically, the substation will contain circuit breakers, step-down transformers, metering equipment, distribution circuit breakers/reclosers, switches and various protective and metering devices. The electricity transfer station 1600 of the present invention is typically installed within or next to the electricity customer's substation. Accordingly, the capacity of the electricity transfer station 1600 is affected by the ratings of the equipment within the substation and by any restrictions imposed by the electricity customer 1222, including but not limited to a maximum electricity flow at the electricity delivery point 1230.

The electricity transfer station 1600 includes one or more electricity transfer devices 1232, an electricity transfer controller 1236 and an arbitrage controller 102. The arbitrage controller 102 can be physically located with the electricity transfer controller 1236, integrated within the electricity transfer controller 1236, or located at a remote location. The electricity transfer station 1600 is connected to the transmission network 1228 or some other transmission network at the electricity re-delivery point 1238, also referred to as a first network connection. As indicated by arrow 1240, also referred to as a second electricity flow, electricity flows from the transmission network 1228 through electricity delivery point 1230 to the electricity customer 1222 and the electricity transfer station 1600. As indicated by arrow 1242, also referred to as a first electricity flow, electricity flows from the electricity transfer station 1600 through electricity re-delivery point 1238 to the transmission network 1228.

The one or more electricity transfer devices 1232 may be a phase-shifting transformer, a static transfer device (AC to direct current ("DC") to AC conversion system), a motor-generator package (AC to DC converter, DC motor and AC generator) or other suitable devices that can regulate the electricity flow through the electricity transfer device 1232.

As indicated by arrow 1240, electricity flows from the electricity delivery point 1230 to primarily serve one or more customer network connections 1244, also referred to as a third network connection. Accordingly, the electricity customer's load is connected to the one or more customer network connections 1244. The electricity flow to the electricity customer 1222 is represented by arrow 1246.

When second electricity flow 1600 is less than an a first value, the one or more electricity transfer devices 1232 will cause a electricity to flow into the electricity transfer station 1600, as indicated by arrow 1248 and referred to as a third electricity flow. The first value is a maximum electricity flow determined by the electricity customer 1222, which may be based on the contractual and/or physical limitations of the electricity customer's substation. The first value may also be the electrical customer's contractual peak demand or other peak demand limit set by the electricity transfer station 1600. The amount of electricity transfer 1248 is controlled by the electricity transfer controller 1236 so that the first electricity flow 1242 back into the transmission network 1228 through electricity re-delivery point 1238 is the desired amount without having the second electricity flow 1240 exceed the first value.

While the making and using of various embodiments of the present invention have been described in detail, it should be appreciated that the present invention provides many applicable inventive concepts which can be embodied in a wide variety of specific contexts. The specific embodiments discussed herein are merely illustrative of specific ways to make and use the invention and does not limit the scope of the invention. It will be understood by those skilled in the art that various modifications can be made therein without departing from the spirit and scope of the invention as set forth in the appended claims

What is claimed is:

1. A computerized method for selecting a mechanical power source for a shaft-driven device from two or more available mechanical power sources, the method comprising the steps of:

providing the shaft-driven device connected to the two or more available mechanical power sources via one or more couplings and one or more drive shafts, wherein the two or more available mechanical power sources comprise at least one motor/generator coupled to an electrical network connection and at least one mechanical power source selected from the group consisting of one or more engines, one or more motors, and one or more turbines;

providing a processor communicably coupled to a database and one or more interfaces to the two or more available mechanical power sources, the shaft-driven device and the one or more couplings;

(a) receiving market and operational data related to the two or more available mechanical power sources, the shaft-driven device, the one or more couplings and the electrical network connection;

(b) analyzing the market and operational data related to the two or more available mechanical power sources, the shaft-driven device by the processor, the one or more couplings and the electrical network connection;

(c) selecting the mechanical power source for the shaft-driven device from the two or more available mechanical power sources based on a set of financial parameters by the processor, wherein the set of financial parameters comprises an estimated operational cost for the at least one motor/generator and the at least one mechanical source, and a projected potential revenue from using the at least one mechanical source to drive both the shaft-driven device and the at least one motor/generator to provide electricity to the external network connection; and (d) whenever the shaft-driven device is not already connected to the selected mechanical power source, the processor (1) determines whether it is profitable to switch the shaft-driven device to the selected mechanical power source based on the projected potential revenue and a projected cost associated with switching to the selected power source, a time period and one or more guidelines, and (2) physically switches the shaft-driven device to the selected mechanical power source by automatically sending one or more control signals to the one or more couplings whenever it is profitable to switch the shaft-driven device to the selected mechanical power source.

2. The method as recited in claim 1, further comprising the step of updating a display.

3. The method as recited in claim 1, further comprising the step of repeating steps (a), (b), (c) and (d).

4. The method as recited in claim 3, wherein steps (a), (b), (c) and (d) are periodically repeated.

5. The method as recited in claim 3, wherein steps (a), (b) and (c) are repeated whenever new market or operational data related to the two or more available mechanical power sources is received.

6. The method as recited in claim 1, wherein the market and operational data is selected from the group consisting of historical operating data, current operating data, contract data, market data and financial data.

7. The method as recited in claim 1, wherein the set of financial parameters comprises one or more operating models.

8. The method as recited in claim 1, wherein the set of financial parameters includes operational cost data, switching cost data, minimum return, projections, market buy/sell prices, contract buy/sell prices, fuel costs, electricity costs, target demand, maximum demand, minimum connect times for each available mechanical power source, maximum switching cycle over a specified period of time, emission limits, audible noise limits or user input data.

9. The method as recited in claim 1, wherein the one or more control signals are sent via computer network, a communications network, a wireless communications link, a direct connection or combination thereof.

10. The method as recited in claim 1, wherein the one or more control signals are manually sent or implemented.

11. The method as recited in claim 1, wherein the shaft-driven device is selected from the group consisting of a shaft-driven compressor and a shaft-driven pump.

12. The method as recited in claim 1, wherein the two or more available mechanical power sources and the shaft-driven device comprise a multi-source system.

13. The method as recited in claim 12, wherein steps (a), (b), (c) and (d) are performed for two or more multi-source systems.

14. The method as recited in claim 12, wherein the multi-source system comprises:
a first and second power source;
a first switch or coupling selectively connecting the first power source to the device or delivery point;
a second switch or coupling selectively connecting the second power source to the device or delivery point; and
a multi-source control system that monitors and/or controls the first power source, the second power source, the first switch or coupling, the second switch or coupling and the device or delivery point.

15. The method as recited in claim 1, wherein:
the two or more available power sources comprise a second network connection, one or more electricity sources, and a combination of the second network connection and the one or more electricity sources;
one or more electricity transfer devices are connected to the one or more electricity sources; and
the device or delivery point comprises one or more third network connections, the one or more third network connections connected to the second network connection and the one or more electricity transfer devices.

16. The method as recited in claim 15, further comprising the step of determining whether provide electricity from the one or more electricity sources to a first network connection connected to the one or more electricity sources and the one or more electricity transfer devices.

17. The method as recited in claim 15, wherein the one or more electricity transfer devices is selected from the group consisting of one or more phase-shifting transformers, one or more static transfer devices and one or more motor-generator packages.

18. The method as recited in claim 15, wherein the first network connection and the second network connection are equivalent metering points connected to an electricity transmission network.

19. The method as recited in claim 15, wherein the one or more third network connections are electricity distribution feeders.

20. The method as recited in claim 1, wherein:
the device or delivery point comprises a machine;
the two or more available power sources comprise an engine and a motor/generator;
the engine coupled to the machine; and
the motor/generator coupled to the machine and an electrical network connection.

21. The method as recited in claim 20, wherein the engine is selected from the group comprising a turbine and a variable speed engine.

22. The method as recited in claim 20, wherein the engine is coupled to the machine with a clutch, a coupling or a gearbox.

23. The method as recited in claim 20, wherein the motor/generator is coupled to the machine with a clutch, a coupling or a gearbox.

24. An apparatus for selecting a mechanical power source for a shaft-driven device from two or more available mechanical power sources comprising:
a user interface;
a market interface;

a multi-source interface comprising one or more interfaces to the two or more available mechanical power sources, the shaft-driven device, and one or more couplings;

a database;

a processor communicably coupled to the user interface, the market interface, the multi-source interface and the database, wherein the processor (a) receives market data from the market interface and operational data related to the two or more available mechanical power sources, the shaft-driven device, the one or more couplings and an electrical network connection from the multi-source interface or the database, (b) analyzes the market and operational data related to the two or more available mechanical power sources, the shaft-driven device, the one or more couplings and the electrical network connection, (c) selects the mechanical power source for the shaft-driven device from the two or more available mechanical power sources based on a set of financial parameters, wherein the set of financial parameters comprises an estimated operational cost for at least one motor/generator and at least one mechanical source, and a projected potential revenue if the at least one mechanical source to drive both the shaft-driven device and the at least one motor/generator to provide electricity to the external network connection and (d) whenever the shaft-driven device is not already connected to the selected mechanical power source, (1) determines whether it is profitable to switch the shaft-driven device to the selected mechanical power source based on the projected potential revenue and a projected cost associated with switching to the selected mechanical power source, a time period and one or more guidelines and (2) physically switches the shaft-driven device to the selected mechanical power source by automatically sending one or more control signals via the multi-source interface to the one or more couplings whenever it is profitable to switch the shaft-driven device to the selected mechanical power source; and wherein the shaft-driven device is connected to the two or more available mechanical power sources via the one or more couplings and one or more drive shafts, wherein the two or more available mechanical power sources comprise the at least one motor/generator coupled to the electrical network connection and the at least one mechanical power source selected from the group consisting of one or more engines, one or more motors, and one or more turbines.

25. The apparatus as recited in claim 24, wherein the processor updates a display via the user interface.

26. The apparatus as recited in claim 24, wherein the multi-source interface comprises a multi-source control system.

27. The apparatus as recited in claim 24, wherein:
the processor monitors and controls the two or more available mechanical power sources, and the device via the multi-source interface.

28. The apparatus as recited in claim 24, wherein the processor periodically repeats the analysis and selection process.

29. The apparatus as recited in claim 27, wherein the processor repeats the analysis and selection process whenever new market or operational data related to the two or more available mechanical power sources is received.

30. The apparatus as recited in claim 24, wherein the market and operational data is selected from the group consisting of historical operating data, current operating data, contract data, market data or financial data.

31. The apparatus as recited in claim 24, wherein the set of financial parameters comprises one or more operating models.

32. The apparatus as recited in claim 24, wherein the set of financial parameters includes operational cost data, switching cost data, minimum return, projections, market buy/sell prices, contract buy/sell prices, fuel costs, electricity costs, target demand, maximum demand, minimum connect times for each available mechanical power source, maximum switching cycle over a specified period of time, emission limits, audible noise limits or user input data.

33. The apparatus as recited in claim 24, wherein the one or more control signals are sent via computer network, a communications network, a wireless communications link, a direct connection or combination thereof.

34. The apparatus as recited in claim 24, wherein the one or more control signals are manually sent or implemented.

35. The apparatus as recited in claim 24, wherein the shaft-driven device is selected from the group consisting of a shaft-driven compressor and a shaft-driven pump.

36. The apparatus as recited in claim 24, wherein the two or more available mechanical power sources and the shaft-driven device comprise a multi-source system.

37. The apparatus as recited in claim 24, wherein the processor performs the analysis and selection process for two or more multi-source systems.

38. The apparatus as recited in claim 37, wherein the multi-source system comprises:
a first and second power source;
a first switch or coupling selectively connecting the first power source to the device or delivery point;
a second switch or coupling selectively connecting the second power source to the device or delivery point; and
a multi-source control system that monitors and/or controls the first power source, the second power source, the first switch or coupling, the second switch or coupling and the device or delivery point.

39. The apparatus as recited in claim 24, wherein:
the two or more available power sources comprise a second network connection, one or more electricity sources, and a combination of the second network connection and the one or more electricity sources;
one or more electricity transfer devices are connected to the one or more electricity sources; and
the device or delivery point comprises one or more third network connections, the one or more third network connections connected to the second network connection and the one or more electricity transfer devices.

40. The apparatus as recited in claim 39, wherein the processor determines whether to provide electricity from the one or more electricity sources to a first network connection connected to the one or more electricity sources and the one or more electricity transfer devices.

41. The apparatus as recited in claim 39, wherein the one or more electricity transfer devices is selected from the group consisting of one or more phase-shifting transformers, one or more static transfer devices and one or more motor-generator packages.

42. The apparatus as recited in claim 39, wherein the first network connection and the second network connection are equivalent metering points connected to an electricity transmission network.

43. The apparatus as recited in claim 39, wherein the one or more third network connections are electricity distribution feeders.

44. The apparatus as recited in claim 24, wherein:
the device or delivery point comprises a machine;
the two or more available power sources comprise an engine and a motor/generator;
the engine is coupled to the machine; and
the motor/generator is coupled to the machine and an electrical network connection.

45. The apparatus as recited in claim 44, wherein the device is selected from the group consisting of a compressor and a pump.

46. The apparatus as recited in claim 44, wherein the engine is selected from the group comprising a turbine and a variable speed engine.

47. The apparatus as recited in claim 44, wherein the engine is coupled to the machine with a clutch, a coupling or a gearbox.

48. The apparatus as recited in claim 44, wherein the motor/generator is coupled to the machine with a clutch, a coupling or a gearbox.

49. The apparatus as recited in claim 24, wherein:
the device or delivery point comprises a machine;
the two or more available power sources comprise an engine and a motor/generator;
the engine is coupled to the motor/generator; and
the motor/generator is coupled to the machine and an electrical network connection.

50. The apparatus as recited in claim 49, wherein the device is selected from the group consisting of a compressor and a pump.

51. The apparatus as recited in claim 49, wherein the engine is selected from the group comprising a turbine and a variable speed engine.

52. The apparatus as recited in claim 49, wherein the engine is coupled to the machine with a clutch, a coupling or a gearbox.

53. The apparatus as recited in claim 49, wherein the motor/generator is coupled to the machine with a clutch, a coupling or a gearbox.

54. A computer program embodied on a non-transitory computer readable medium and executed by a processor for selecting a mechanical power source for a shaft-driven device from two or more available mechanical power sources, the computer program comprising:
a code segment for receiving market data and operational data related to the two or more available mechanical power sources, the shaft-driven device, one or more couplings and an electrical network connection;
a code segment for analyzing market and operational data related to the two or more available mechanical power sources, the shaft-driven device, the one or more couplings and the electrical network connection;
a code segment for selecting the mechanical power source for the shaft-driven device from the two or more available mechanical power sources based on a set of financial parameters, wherein the set of financial parameters comprises an estimated operational cost for the at least one motor/generator and the at least one mechanical source, and a projected potential revenue from using the at least one mechanical source to drive both the shaft-driven device and the at least one motor/generator to provide electricity to the external network connection;
a code segment for whenever the shaft-driven device is not already connected to the selected mechanical power source, (1) determining whether it is profitable to switch the shaft-driven device to the selected mechanical power source based on the projected potential revenue and a projected cost associated with switching to the selected mechanical power source, a time period and one or more guidelines, and (2) physically switching the shaft-driven device to the selected mechanical power source by automatically sending one or more control signals to one or more couplings via one or more interfaces communicably coupled to the processor whenever it is profitable to switch the shaft-driven device to the selected mechanical power source; and
wherein the shaft-driven device is connected to the two or more available mechanical power sources via the one or more couplings and one or more drive shafts, wherein the two or more available mechanical power sources comprise at least one motor/generator coupled to an electrical network connection and at least one mechanical power source selected from the group consisting of one or more engines, one or more motors, and one or more turbines.

55. The computer program as recited in claim 54, further comprising a code segment for updating a display.

56. The computer program as recited in claim 54, further comprising a code segment for repeating the analysis, selecting and sending processes.

57. The computer program as recited in claim 56, wherein the analysis, selecting and sending processes are periodically repeated.

58. The computer program as recited in claim 56, wherein the analysis, selecting and sending processes are repeated whenever new market or operational data related to the two or more available mechanical power sources is received.

59. The computer program as recited in claim 54, wherein the market and operational data is selected from the group consisting of historical operating data, current operating data, contract data, market data and financial data.

60. The computer program as recited in claim 54, wherein the set of financial parameters comprises one or more operating models.

61. The computer program as recited in claim 54, wherein the set of financial parameters includes operational cost data, switching cost data, minimum return, projections, market buy/sell prices, contract buy/sell prices, fuel costs, electricity costs, target demand, maximum demand, minimum connect times for each available mechanical power source, maximum switching cycle over a specified period of time, emission limits, audible noise limits or user input data.

62. The computer program as recited in claim 54, wherein the one or more control signals are sent via computer network, a communications network, a wireless communications link, a direct connection or combination thereof.

63. The computer program as recited in claim 54, wherein the one or more control signals are manually sent or implemented.

64. The computer program as recited in claim 54, wherein the shaft-driven device is selected from the group consisting of a shaft-driven compressor and a shaft-driven pump.

65. The computer program as recited in claim 54, wherein the two or more available mechanical power sources and the shaft-driven device comprise a multi-source system.

66. The computer program as recited in claim 65, wherein the analysis, selection and sending processes are performed for two or more multi-source systems.

67. The computer program as recited in claim 65, wherein the multi-source system comprises:
a first and second power source;

a first switch or coupling selectively connecting the first power source to the device or delivery point;

a second switch or coupling selectively connecting the second power source to the device or delivery point; and a multi-source control system that monitors and/or controls the first power source, the second power source, the first switch or coupling, the second switch or coupling and the device or delivery point.

68. The computer program as recited in claim 54, wherein:

the two or more available power sources comprise a second network connection, one or more electricity sources, and a combination of the second network connection and the one or more electricity sources;

one or more electricity transfer devices are connected to the one or more electricity sources; and the device or delivery point comprises one or more third network connections, the one or more third network connections connected to the second network connection and the one or more electricity transfer devices.

69. The computer program as recited in claim 68, further comprising a code segment for determining whether to provide electricity from the one or more electricity sources to a first network connection connected to the one or more electricity sources and the one or more electricity transfer devices.

70. The computer program as recited in claim 68, wherein the one or more electricity transfer devices is selected from the group consisting of one or more phase-shifting transformers, one or more static transfer devices and one or more motor-generator packages.

71. The computer program as recited in claim 68, wherein the first network connection and the second network connection are equivalent metering points connected to an electricity transmission network.

72. The computer program as recited in claim 68, wherein the one or more third network connections are electricity distribution feeders.

73. A computer program as recited in claim 54, wherein:

the device or delivery point comprises a machine;

the two or more available power sources comprise an engine and a motor/generator;

the engine coupled to the machine; and the motor/generator coupled to the machine and an electrical network connection.

74. The computer program as recited in claim 73, wherein the engine is selected from the group comprising a turbine and a variable speed engine.

75. The computer program as recited in claim 73, wherein the engine is coupled to the machine with a clutch, a coupling or a gearbox.

76. The computer program as recited in claim 73, wherein the motor/generator is coupled to the machine with a clutch, a coupling or a gearbox.

* * * * *